US012695802B2

(12) United States Patent
Liao et al.

(10) Patent No.: US 12,695,802 B2
(45) Date of Patent: Jul. 28, 2026

(54) BLOCKCHAIN-BASED DATA PROCESSING METHOD, DEVICE, AND READABLE STORAGE MEDIUM

(71) Applicant: TENCENT TECHNOLOGY (SHENZHEN) COMPANY LIMITED, Shenzhen (CN)

(72) Inventors: Zhiyong Liao, Shenzhen (CN); Zongyou Wang, Shenzhen (CN); Yifang Shi, Shenzhen (CN); Gengliang Zhu, Shenzhen (CN); Qucheng Liu, Shenzhen (CN); Hanqing Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 47 days.

(21) Appl. No.: 18/812,313

(22) Filed: Aug. 22, 2024

(65) Prior Publication Data

US 2024/0414230 A1     Dec. 12, 2024

Related U.S. Application Data

(63) Continuation of application No. PCT/CN2023/117186, filed on Sep. 6, 2023.

(30) Foreign Application Priority Data

Sep. 26, 2022    (CN) .......................... 202211182614.7

(51) Int. Cl.
| | | |
|---|---|---|
| *H04L 67/1097* | (2022.01) | |
| *H04L 9/40* | (2022.01) | |
| *H04L 67/568* | (2022.01) | |

(52) U.S. Cl.
CPC ...... *H04L 67/1097* (2013.01); *H04L 63/0823* (2013.01); *H04L 67/568* (2022.05)

(58) Field of Classification Search
CPC .............. H04L 67/1097; H04L 67/568; H04L 63/0823
See application file for complete search history.

(56) References Cited

U.S. PATENT DOCUMENTS

| | | | |
|---|---|---|---|
| 11,343,313 B1 | 5/2022 | Manevich et al. | |
| 2019/0377648 A1 | 12/2019 | Abraham et al. | |

(Continued)

FOREIGN PATENT DOCUMENTS

| | | |
|---|---|---|
| AU | 2019203865 A1 | 5/2019 |
| CN | 109766673 A | 5/2019 |

(Continued)

OTHER PUBLICATIONS

The World Intellectual Property Organization (WIPO) International Search Report for PCT/CN2023/117186 Nov. 21, 2023 5 Pages (including translation).

(Continued)

*Primary Examiner* — Clayton R Williams
(74) *Attorney, Agent, or Firm* — Anova Law Group, PLLC

(57) ABSTRACT

A blockchain-based data processing method includes: assigning, in response to that a first request message with a sequence number n has a first prepared certificate, a sequence number n+1 to a second request message; associatively storing the first request message and a first response result corresponding to the first request message in response to that the second request message has a second prepared certificate; performing in parallel a request operation corresponding to the second request message while associatively storing the first request message and the first response result, to obtain a second response result corre- (Continued)

sponding to the second request message; and returning, to a client, a first initial response message generated based on the second response result, for the client to determine a first request execution result corresponding to the second request message based on the first initial response message and a backup initial response message.

20 Claims, 11 Drawing Sheets

(56) References Cited

U.S. PATENT DOCUMENTS

| | | | | |
|---|---|---|---|---|
| 2020/0201964 | A1* | 6/2020 | Nandakumar | ...... H04L 63/0861 |
| 2022/0131691 | A1* | 4/2022 | Gupta | ................... H04L 9/3265 |
| 2022/0391872 | A1* | 12/2022 | Sharma | ................ G06Q 20/363 |
| 2023/0169517 | A1* | 6/2023 | Garner, IV | ............. G06Q 40/02 |
| | | | | 705/35 |

FOREIGN PATENT DOCUMENTS

| | | |
|---|---|---|
| CN | 112101942 A | 12/2020 |
| CN | 113055188 A | 6/2021 |

OTHER PUBLICATIONS

Castro, Miguel, and Barbara Liskov. "Practical byzantine fault tolerance." OsDI. Vol. 99. No. 1999. 1999.

The European Patent Office (EPO) The Extended European Search Report for Application No. 23870213.8 Jun. 25, 2025 9 Pages.

Miguel Castro "Practical byzantine fault tolerance." Retrieved from the Internet: URL: http://pmg.casil.mit.edu/~castro/thesis.pdf, Jan. 31, 2001 (Jan. 31, 2001), pp. 1-172.

* cited by examiner

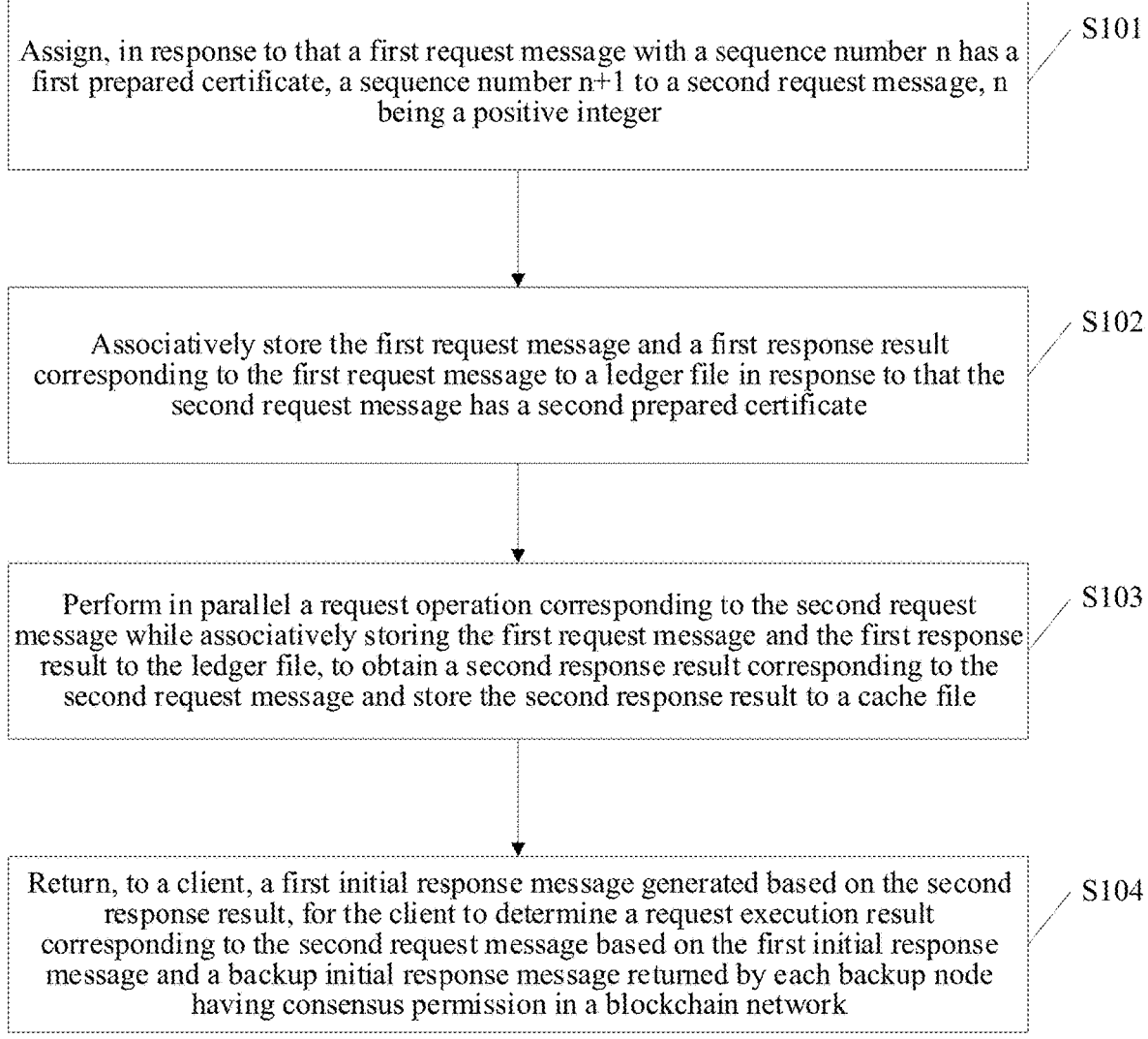

Assign, in response to that a first request message with a sequence number n has a first prepared certificate, a sequence number n+1 to a second request message, n being a positive integer

S101

Associatively store the first request message and a first response result corresponding to the first request message to a ledger file in response to that the second request message has a second prepared certificate

S102

Perform in parallel a request operation corresponding to the second request message while associatively storing the first request message and the first response result to the ledger file, to obtain a second response result corresponding to the second request message and store the second response result to a cache file

S103

Return, to a client, a first initial response message generated based on the second response result, for the client to determine a request execution result corresponding to the second request message based on the first initial response message and a backup initial response message returned by each backup node having consensus permission in a blockchain network

Figure 7:
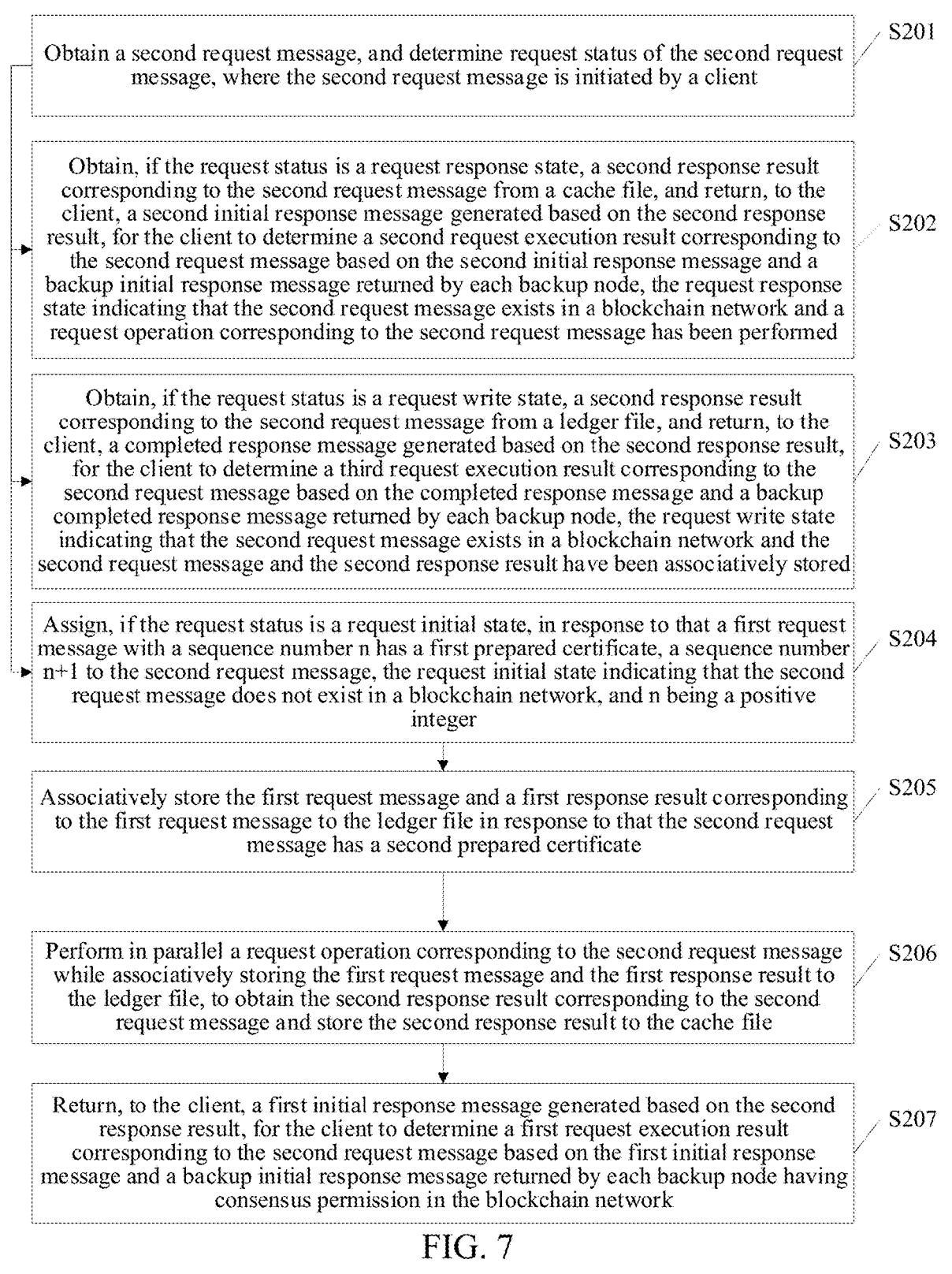

Obtain a second request message, and determine request status of the second request message, where the second request message is initiated by a client

S201

Obtain, if the request status is a request response state, a second response result corresponding to the second request message from a cache file, and return, to the client, a second initial response message generated based on the second response result, for the client to determine a second request execution result corresponding to the second request message based on the second initial response message and a backup initial response message returned by each backup node, the request response state indicating that the second request message exists in a blockchain network and a request operation corresponding to the second request message has been performed

S202

Obtain, if the request status is a request write state, a second response result corresponding to the second request message from a ledger file, and return, to the client, a completed response message generated based on the second response result, for the client to determine a third request execution result corresponding to the second request message based on the completed response message and a backup completed response message returned by each backup node, the request write state indicating that the second request message exists in a blockchain network and the second request message and the second response result have been associatively stored

S203

Assign, if the request status is a request initial state, in response to that a first request message with a sequence number n has a first prepared certificate, a sequence number n+1 to the second request message, the request initial state indicating that the second request message does not exist in a blockchain network, and n being a positive integer

S204

Associatively store the first request message and a first response result corresponding to the first request message to the ledger file in response to that the second request message has a second prepared certificate

S205

Perform in parallel a request operation corresponding to the second request message while associatively storing the first request message and the first response result to the ledger file, to obtain the second response result corresponding to the second request message and store the second response result to the cache file

S206

Return, to the client, a first initial response message generated based on the second response result, for the client to determine a first request execution result corresponding to the second request message based on the first initial response message and a backup initial response message returned by each backup node having consensus permission in the blockchain network

Figure 8:
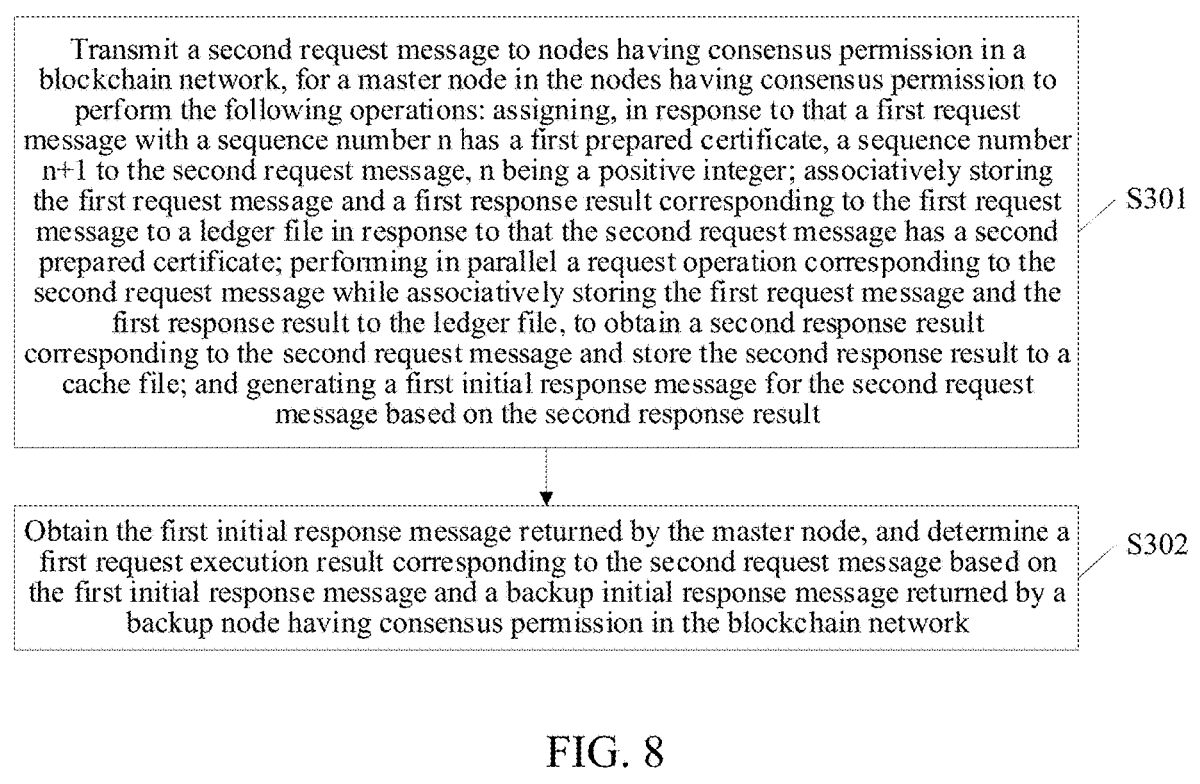

Transmit a second request message to nodes having consensus permission in a blockchain network, for a master node in the nodes having consensus permission to perform the following operations: assigning, in response to that a first request message with a sequence number n has a first prepared certificate, a sequence number n+1 to the second request message, n being a positive integer; associatively storing the first request message and a first response result corresponding to the first request message to a ledger file in response to that the second request message has a second prepared certificate; performing in parallel a request operation corresponding to the second request message while associatively storing the first request message and the first response result to the ledger file, to obtain a second response result corresponding to the second request message and store the second response result to a cache file; and generating a first initial response message for the second request message based on the second response result

S301

Obtain the first initial response message returned by the master node, and determine a first request execution result corresponding to the second request message based on the first initial response message and a backup initial response message returned by a backup node having consensus permission in the blockchain network

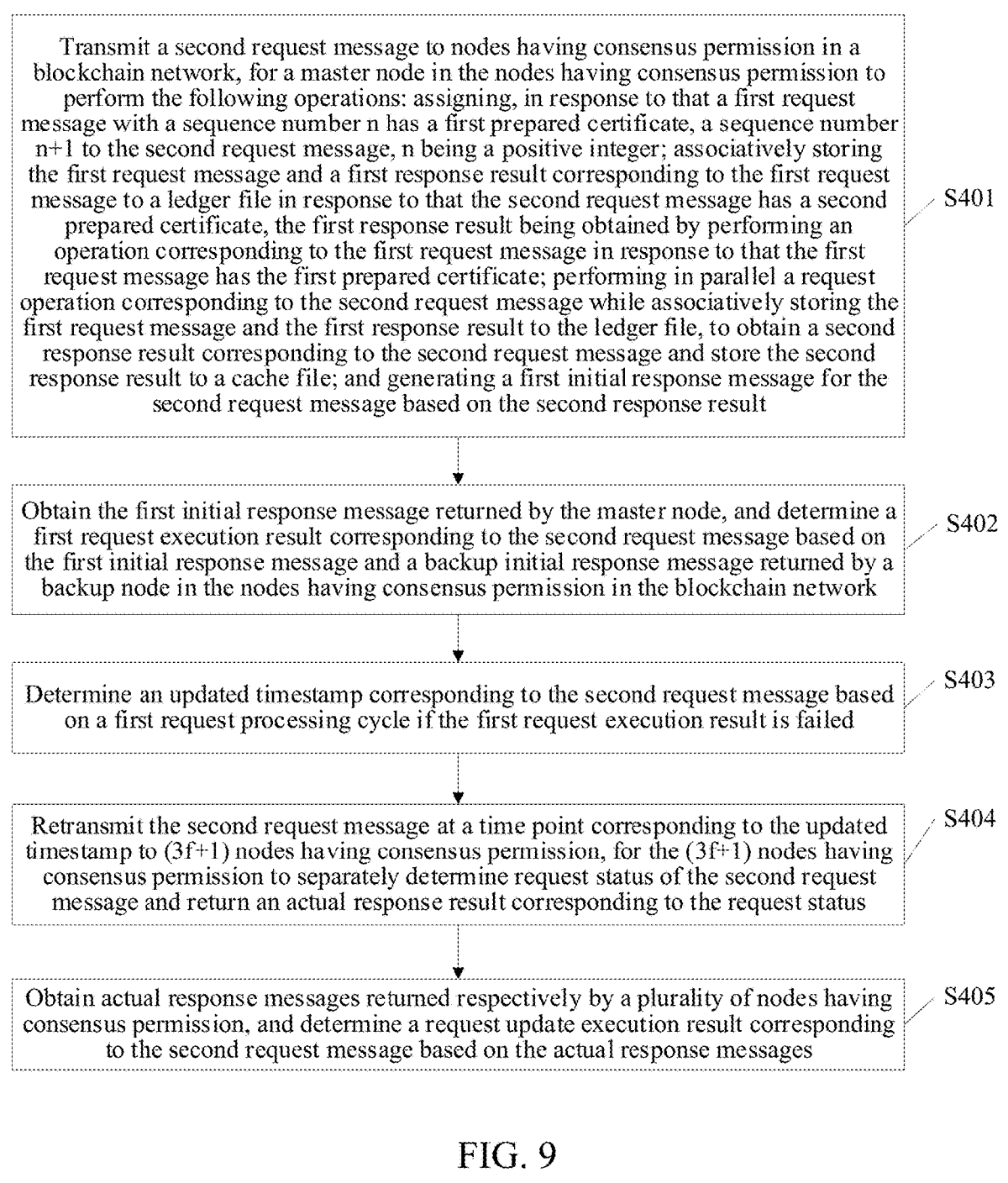

Transmit a second request message to nodes having consensus permission in a blockchain network, for a master node in the nodes having consensus permission to perform the following operations: assigning, in response to that a first request message with a sequence number n has a first prepared certificate, a sequence number n+1 to the second request message, n being a positive integer; associatively storing the first request message and a first response result corresponding to the first request message to a ledger file in response to that the second request message has a second prepared certificate, the first response result being obtained by performing an operation corresponding to the first request message in response to that the first request message has the first prepared certificate; performing in parallel a request operation corresponding to the second request message while associatively storing the first request message and the first response result to the ledger file, to obtain a second response result corresponding to the second request message and store the second response result to a cache file; and generating a first initial response message for the second request message based on the second response result ⟋ S401

Obtain the first initial response message returned by the master node, and determine a first request execution result corresponding to the second request message based on the first initial response message and a backup initial response message returned by a backup node in the nodes having consensus permission in the blockchain network ⟋ S402

Determine an updated timestamp corresponding to the second request message based on a first request processing cycle if the first request execution result is failed ⟋ S403

Retransmit the second request message at a time point corresponding to the updated timestamp to (3f+1) nodes having consensus permission, for the (3f+1) nodes having consensus permission to separately determine request status of the second request message and return an actual response result corresponding to the request status ⟋ S404

Obtain actual response messages returned respectively by a plurality of nodes having consensus permission, and determine a request update execution result corresponding to the second request message based on the actual response messages ⟋ S405

FIG. 9

Blockchain-based data processing apparatus

Computer device

BLOCKCHAIN-BASED DATA PROCESSING METHOD, DEVICE, AND READABLE STORAGE MEDIUM

CROSS-REFERENCES TO RELATED APPLICATIONS

This application is a continuation application of PCT Patent Application No. PCT/CN2023/117186, filed on Sep. 6, 2023, which claims priority to Chinese Patent Application No. 202211182614.7, filed with the China National Intellectual Property Administration on Sep. 26, 2022 and entitled "BLOCKCHAIN-BASED DATA PROCESSING METHOD, DEVICE, AND READABLE STORAGE MEDIUM", both of which are incorporated herein by reference in their entirety.

FIELD OF THE TECHNOLOGY

The present disclosure relates to the field of Internet technologies, and in particular, to a blockchain-based data processing method, a device, and a readable storage medium.

BACKGROUND OF THE DISCLOSURE

With the rapid development of network technology and the emphasis by enterprises on data security, blockchain technology has been greatly emphasized and applied.

When obtaining a request message, a master node (namely, a block generation node) needs to broadcast the request message to a backup node (namely, another consensus node), to perform a consensus on the request message.

SUMMARY

Embodiments of the present disclosure provide a blockchain-based data processing method, a device, and a readable storage medium, which can not only improve consensus efficiency of a blockchain network, but also reduce a response delay of a client and improve efficiency of the client for determining a request execution result.

An embodiment of the present disclosure provides a blockchain-based data processing method. The method is performed by a master node having consensus permission in a blockchain network. The method includes: assigning, in response to that a first request message with a sequence number n has a first prepared certificate, a sequence number n+1 to a second request message, n being a positive integer; associatively storing the first request message and a first response result corresponding to the first request message to a ledger file in response to that the second request message has a second prepared certificate, the first response result being obtained by performing an operation corresponding to the first request message in response to that the first request message has the first prepared certificate; performing in parallel a request operation corresponding to the second request message while associatively storing the first request message and the first response result to the ledger file, to obtain a second response result corresponding to the second request message and store the second response result to a cache file; and returning, to a client that initiates the second request message, a first initial response message generated based on the second response result, for the client to determine a first request execution result corresponding to the second request message based on the first initial response message and a backup initial response message returned by a backup node having consensus permission in a blockchain network.

An embodiment of the present disclosure provides a blockchain-based data processing method. The method is performed by a client. The method includes: transmitting a second request message to nodes having consensus permission in a blockchain network, for a master node in the nodes having consensus permission to perform the following operations: assigning, in response to that a first request message with a sequence number n has a first prepared certificate, a sequence number n+1 to the second request message, n being a positive integer; associatively storing the first request message and a first response result corresponding to the first request message to a ledger file in response to that the second request message has a second prepared certificate, the first response result being obtained by the master node performing an operation corresponding to the first request message in response to that the first request message has the first prepared certificate; performing in parallel a request operation corresponding to the second request message while associatively storing the first request message and the first response result to the ledger file, to obtain a second response result corresponding to the second request message and store the second response result to a cache file; generating a first initial response message for the second request message based on the second response result; and obtaining the first initial response message returned by the master node, and determining a first request execution result corresponding to the second request message based on the first initial response message and a backup initial response message returned by a backup node in the nodes having consensus permission.

An embodiment of the present disclosure provides a computer device, including: a processor, a memory, and a network interface.

The processor is connected to the memory and the network interface. The network interface is configured to provide a data communication function. The memory is configured to store a computer program. The processor is configured to call the computer program, to enable the computer device to perform the method in the embodiments of the present disclosure.

An embodiment of the present disclosure provides a non-transitory computer-readable storage medium. The computer-readable storage medium stores a computer program. The computer program is adapted to be loaded and executed by a processor, to implement the method in the embodiments of the present disclosure.

An embodiment of the present disclosure provides a computer program product. The computer program product includes a computer program. The computer program is stored in a computer-readable storage medium. A processor of a computer device reads the computer program from the computer-readable storage medium. The processor executes the computer program to enable the computer device to perform the method in the embodiments of the present disclosure.

BRIEF DESCRIPTION OF THE DRAWINGS

FIG. 2 is a schematic flowchart of a blockchain-based data processing method according to an embodiment of the present disclosure.

FIG. 7 is another schematic flowchart of a blockchain-based data processing method according to an embodiment of the present disclosure.

FIG. 8 is another schematic flowchart of a blockchain-based data processing method according to an embodiment of the present disclosure.

FIG. 9 is another schematic flowchart of a blockchain-based data processing method according to an embodiment of the present disclosure.

DESCRIPTION OF EMBODIMENTS

Figure 1:
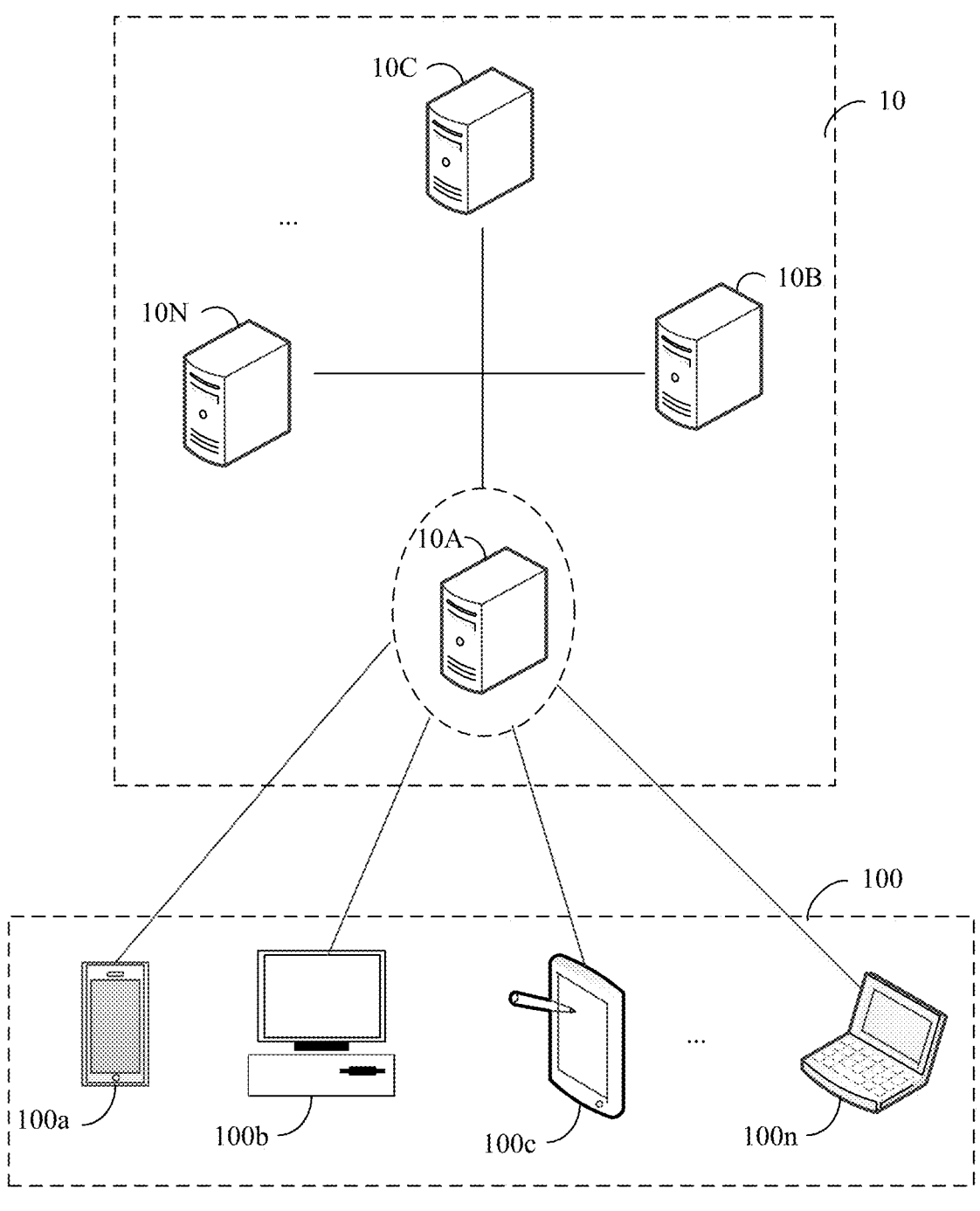
FIG. 1 is a schematic diagram of a system architecture according to an embodiment of the present disclosure.

To make the objectives, technical solutions, and advantages of the present disclosure clearer, the following further describes the present disclosure in detail with reference to the accompanying drawings.

In some implementations, the practical Byzantine fault tolerance (PBFT) algorithm, one of the core algorithms of a blockchain, performs a consensus on a request message based on a three-phase protocol. The three-phase protocol includes a pre-prepare phase, a prepare phase, and a commit phase. The commit phase can ensure agreement on cross-view request ordering, but increases a quantity of times of network interaction for each consensus, which not only reduces consensus efficiency of a blockchain network, but also increases response time of a client and reduces efficiency of the client for determining a request execution result of a request message.

To resolve the foregoing problems, the embodiments of the present disclosure provide a blockchain-based data processing method, which is described below in detail:

For ease of understanding, some terms are first briefly explained below:

1. Blockchain: In a narrow sense, a blockchain is a chain data structure with a block as a basic unit. In the block, a previously obtained transaction history is checked by using a digital digest, which meets the needs of tamper-proofing and extendibility in distributed ledger scenarios. In a broad sense, the blockchain further refers to a distributed ledger technology implemented by using a blockchain structure, including distributed consensuses, privacy and security protection, peer-to-peer communication technologies, network protocols, smart contracts, and the like. An objective of the blockchain is to implement a distributed data recording ledger that only allows addition and no deletion. An underlying structure of the ledger is a linear linked list. The linked list is formed by "blocks" connected in series. A subsequent block records a hash value of a previous block. Whether each block (with a transaction in the block) is valid may be quickly checked by calculating the hash value. If a node in a network proposes to add a new block, the block has to be confirmed to reach a consensus by a consensus mechanism.

2. Block: A block is a data packet that carries transaction data on a blockchain network and is a data structure marked with a timestamp and a hash value corresponding to a previous block. The block is verified by a consensus mechanism of the network, and a transaction in the block is confirmed. A block includes a block header and a block body. The block header may record meta information of a current block, including data such as a current version number, a hash value corresponding to a previous block, a timestamp, a random number, and a hash value of a Merkle root. The block body may record detailed data generated within a period of time, including all transaction records or other information, with a current block verified, that is generated in a block creation process, which may be understood as a presentation form of a ledger. In addition, the detailed data of the block body may include the generation of a unique Merkle root through a hashing process of a Merkle tree and the recording of the unique Merkle root in the block header.

A previous block is also referred to as a parent block. The blockchain implements temporal ordering by recording a hash value corresponding to a block and a hash value corresponding to a parent block in the block header.

3. Hash value: A hash value is also referred to as an information eigenvalue or an eigenvalue. The hash value is generated by converting input data of any length into a cipher by using a hash algorithm and fixedly outputting the cipher. The original input data cannot be retrieved by decrypting the hash value, because the hash algorithm is a one-way cryptographic function. In a blockchain, each block (except an initial block) includes a hash value of a previous block. The hash value is the potential core foundation and the most important aspect in the blockchain technology, which preserves the authenticity of data recording and viewing, and the integrity of the blockchain as a whole.

4. Blockchain node: A blockchain network classifies nodes into consensus nodes (also referred to as core nodes) and synchronization nodes (which may include data nodes and light nodes). A consensus node is responsible for a consensus service of a whole blockchain network. A synchronization node is responsible for synchronizing ledger information of the consensus node, that is, synchronizing the latest block data. An internal structure of the consensus node and an internal structure of the synchronization node both include a network communication component. As the blockchain network is essentially a peer-to-peer (P2P) network, both the consensus node and the synchronization node need to communicate with other nodes in the blockchain network by using a P2P component. Resources and services in the blockchain network are distributed on nodes, and information transmission and service implementation are directly performed between the nodes, without the intervention of an intermediate link or a centralized server (a third party).

In the embodiments of the present disclosure, a node having consensus permission in a blockchain network is a consensus node. In the practical Byzantine fault tolerance algorithm, the consensus node may include a master node (having block generation permission) and a backup node. A total quantity of consensus nodes is 3$f$+1, and a total quantity of backup nodes is 3$f$, where f is a positive integer and f represents a maximum quantity of invalid backup nodes.

5. Asymmetric signing: A signing algorithm includes two keys: a public key and a private key. The public key and the private key are a pair. If data is signed using the private key, signature verification can be performed only using the corresponding public key. This algorithm is referred to as asymmetric signing because a signing process and a signature verification process respectively use two different keys. A basic process of implementing a confidential information exchange by asymmetric signing may be as follows: A party A generates a pair of keys and makes the public key public. When the party A needs to send a message to another role (a party B), the party A signs the confidential message using the private key and then sends the confidential message to the party B. The party B then performs signature verification on the signed message using the public key of the party A.

Refer to FIG. 1. FIG. 1 is a schematic diagram of a system architecture according to an embodiment of the present disclosure. As shown in FIG. 1, the system architecture may include a terminal device cluster 100 and a blockchain network. The terminal device cluster 100 may include a terminal device 100a, a terminal device 100b, a terminal device 100c, and a terminal device 100n. A quantity of terminal devices in the terminal device cluster 100 is not limited in the embodiments of the present disclosure. There may be one or more terminal devices.

The blockchain network may include a blockchain node cluster 10 having consensus permission. The blockchain node cluster 10 may include a blockchain node 10A, a blockchain node 10B, a blockchain node 10C, and a blockchain node 10N. Similarly, a quantity of blockchain nodes in the blockchain node cluster 10 is not limited. There may be four or more blockchain nodes. The blockchain nodes in the blockchain node cluster 10 include one master node (for example, the blockchain node 10A) and 3$f$ backup nodes (for example, the blockchain node 10B, the blockchain node 10C, and the blockchain node 10N) in the embodiments of the present disclosure.

There may be a communication connection between the terminal devices in the terminal device cluster 100. For example, there is a communication connection between the terminal device 100c and the terminal device 100a. There may be a communication connection between the blockchain nodes in the blockchain node cluster 10. For example, there is a communication connection between the blockchain node 10A and the blockchain node 10C, and there is a communication connection between the blockchain node 10A and the blockchain node 10N. There may be a communication connection between any blockchain node in the blockchain node cluster 10 and any terminal device in the terminal device cluster 100. For example, there is a communication connection between the blockchain node 10A and the terminal device 100b, there is a communication connection between the blockchain node 10N and the terminal device 100n, there is a communication connection between the blockchain node 10C and the terminal device 100a, and there is a communication connection between the blockchain node 10A and the terminal device 100c. The communication connection is not limited to a connection manner, which may be implemented directly or indirectly in a wired communication manner, or may be implemented directly or indirectly in a wireless communication manner, or may be implemented in another manner. This is not limited in the present disclosure.

Data or block transmission may be performed between the blockchain nodes through the communication connection. The communication connection between the blockchain nodes may be based on a node identifier. Each blockchain node in the blockchain network has a corresponding node identifier, and the blockchain node can store a node identifier of another blockchain node that has a connection relationship with the blockchain node, so that subsequently obtained data or a subsequently generated block is broadcast to another blockchain node based on the node identifier of another blockchain node. For example, the blockchain node 10A may maintain a node identifier list, and the node identifier list stores node names and node identifiers of other blockchain nodes, as shown in Table 1.

TABLE 1

| Node name | Node identifier |
| --- | --- |
| Blockchain node 10B | AAAAA |
| Blockchain node 10C | BBBBB |
| ... | ... |
| Blockchain node 10N | CCCCC |

The node identifier may be an Internet protocol (IP) address and any other information that can identify the blockchain node in the blockchain network.

Assuming that a node identifier of the blockchain node 10A is FFFFFF, the blockchain node 10A may send a pre-prepare message to the blockchain node 10N based on the node identifier CCCCC, and the blockchain node 10N may determine, based on the node identifier FFFFFF, that the pre-prepare message is sent by the blockchain node 10A. Similarly, the blockchain node 10N may send a prepare message to the blockchain node 10C based on the node identifier BBBBBB, and the blockchain node 10C may learn, based on the node identifier CCCCCC, that the prepare message is sent by the blockchain node 10N. Data transmission between other nodes is also implemented in this way, and details are not described herein again.

During normal working, each blockchain node in the blockchain node cluster 10 may receive a request message sent by a client in the terminal device, generate a block based on the received request message, and then perform block on-chain processing. Data related to user information (such as a request message and a response result) that is involved in embodiments of the present disclosure needs permission or consent of users when the embodiments of the present disclosure are applied to specific products or technologies, and collection, use, and processing of relevant data need to comply with relevant laws, regulations, and standards of relevant countries and regions.

A client may be installed in each terminal device in the terminal device cluster 100 shown in FIG. 1. The client when run in each terminal device may perform data interaction, that is, the communication connection, with the blockchain node cluster 10 shown in FIG. 1. The client may be an application client with a function of sending a request message, such as a video application, a social application, an instant messaging application, an office software application, a navigation application, a shopping application, a financial management application, a business application, or a browser. The client may be a standalone client or may be an embedded subclient integrated into a client (for example, a social client, an educational client, or a multimedia client). This is not limited herein.

The blockchain node in FIG. 1 includes, but is not limited to, a mobile terminal or a server. The server may be an independent physical server, or may be a server cluster or distributed system including a plurality of physical servers, or may be a cloud server providing basic cloud computing services such as cloud services, cloud databases, cloud computing, cloud functions, cloud storage, network services, cloud communication, middleware services, domain name services, security services, content delivery networks (CDNs), and big data and artificial intelligence platforms. The mobile terminal includes, but is not limited to, a mobile phone, a computer, an intelligent voice interaction device, a smart home appliance, an on-board terminal, and an aerial vehicle. The terminal mobile and the server may be directly or indirectly connected in a wired or wireless manner. This is not limited in the embodiments of the present disclosure.

Further, refer to FIG. 2. FIG. 2 is a schematic flowchart of a blockchain-based data processing method according to an embodiment of the present disclosure. The blockchain-based data processing method may be performed by a master node having consensus permission in a blockchain network. As shown in FIG. 2, the blockchain-based data processing method may include at least the following operations S101 to S104.

S101: Assign, in response to that a first request message with a sequence number n has a first prepared certificate, a sequence number n+1 to a second request message, n being a positive integer.

Specifically, the data processing method involved in this embodiment of the present disclosure may be for improving a consensus algorithm (for example, the PBFT algorithm), to reduce network complexity during the consensus. The PBFT algorithm, meaning the practical Byzantine fault tolerance algorithm, is a distributed consistency algorithm that can tolerate a specific Byzantine fault. The PBFT algorithm can reach a consensus in a scenario where few nodes do evil (for example, forge a message), ensure tamper-proofing, forgery-proofing, and non-repudiation in a message delivery process by using cryptographic algorithms such as signing, signature verification, and hashing, and optimize previous work to reduce the complexity of the Byzantine fault tolerance algorithm from an exponential level to a polynomial level.

In this embodiment of the present disclosure, a total quantity of nodes having consensus permission may be a positive integer (3$f$+1), where f may indicate a maximum quantity of invalid nodes in the blockchain network. The invalid node may not transmit a message, or may transmit an inconsistent message in an attempt to disrupt other nodes. The PBFT algorithm is not dependent on unrealistic assumptions, allows invalid nodes (namely, malicious nodes) to delay network transmissions between valid nodes (namely, non-malicious nodes), and can provide security and activity when the invalid nodes are fewer than ⅓ of all the nodes. For example, when no less than (2$f$+1) valid nodes work normally, nodes in the blockchain network can reach consistency. For example, a maximum quantity of invalid nodes that can be allowed to exist in a blockchain system with seven nodes is 2.

The PBFT algorithm may record consensus status of each node using a view. Under the same view (that is, with the same view number), all nodes in the blockchain network can maintain the same node list. The node list may include a master node and a backup node. A view switch occurs when the master node fails. Each view switch changes the master node, and numbers of views are consecutive. If a view switch is successful, the PBFT algorithm may determine a new master node based on a new view. In this embodiment of the present disclosure, a node for packaging a request message and generating a block may be referred to as a master node in the blockchain network. In this embodiment of the present disclosure, a node that is other than the master node in the blockchain network and that has consensus permission may be referred to as a backup node.

Figure 3:
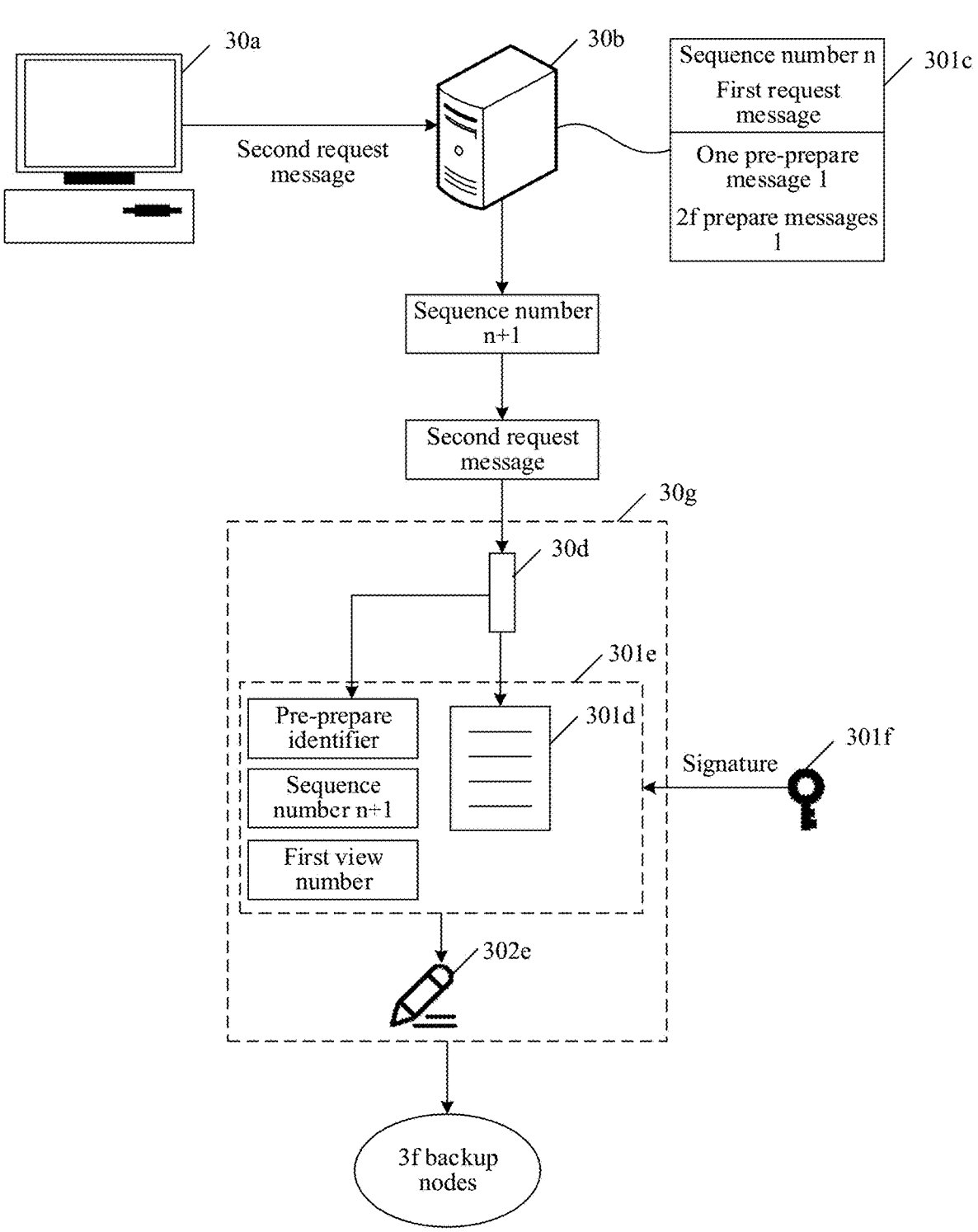
FIG. 3 is a schematic diagram of a blockchain-based data processing scenario according to an embodiment of the present disclosure.

Refer to FIG. 3. FIG. 3 is a schematic diagram 1 of a blockchain-based data processing scenario according to an embodiment of the present disclosure. As shown in FIG. 3, a client is installed in a terminal device 30$a$. A specific service of the client is not limited in the embodiments of the present disclosure, and may be configured based on an actual application scenario. In this case, specific content of the second request message initiated by the client is not limited in the embodiments of the present disclosure, and may be set based on the specific service of the client, which includes but is not limited to issuance and red-ink entry of electronic invoices, and generation, transfer, and on-chain of digital assets.

The client installed in the terminal device 30$a$ may directly send the second request message to a master node 30$b$, or may send the second request message to a backup node, and the backup node forwards the second request message to the master node 30$b$. After receiving the second request message, the master node first checks the second request message. For the check on the second request message, this embodiment of the present disclosure does not make a description, and refer to a description of S201 in an embodiment corresponding to FIG. 7 below. There may be one or more second request messages. A total quantity of second request messages is not limited in the embodiments of the present disclosure. If there are a plurality of second request messages, including a second request message 1, a second request message 2, . . . , and a second request message 4, the second request message 1, the second request message 2, . . . , and the second request message 4 may be sent by one client, that is, there is one terminal device 30$a$. In some embodiments, the second request message 1, the second request message 2, . . . , and the second request message 4 may be sent respectively by different clients, that is, there may be a plurality of terminal devices 30$a$.

In the blockchain network, the request message (including the first request message and the second request message) involved in this embodiment of the present disclosure may be understood as a service transaction. In this case, when the check on the second request message is successful, the master node 30$b$ may add the second request message into a transaction cache pool. Still refer to FIG. 3. In response to that the first request message with the sequence number n has the first prepared certificate 301$c$, the master node 30$b$ may assign the sequence number n+1 to the second request message. The first prepared certificate 301$c$ may include one pre-prepare message 1 and 2$f$ prepare messages 1 for the first request message. A processing process (such as a generation process, a broadcast process, or a check process) of the pre-prepare message 1 is the same as a processing process of a pre-prepare message (for example, the pre-prepare message 30$g$ in FIG. 3) corresponding to the second request message. A processing process (such as a generation process, a broadcast process, or a check process) of the 2$f$ prepare messages 1 is the same as a processing process of a prepare message corresponding to the second request message. In this case, for the processing process of the pre-prepare message 1 and the processing process of the 2$f$ prepare messages 1, a description is not made herein, and refer to the processing process of the pre-prepare message 30g and the processing process of the prepare message corresponding to the second request message in S102 below.

S102: Associatively store the first request message and a first response result corresponding to the first request message to a ledger file in response to that the second request message has a second prepared certificate.

Specifically, a pre-prepare message is generated based on the sequence number n+1 and the second request message; the pre-prepare message is broadcast to one or more backup nodes having consensus permission in the blockchain network, for each backup node to check the pre-prepare message to obtain a first check result, and the first check result is used to instruct/cause a backup node to generate, in response to the first check result being successful, a prepare message corresponding to the second request message; and the prepare message returned by a backup node is obtained, and the second prepared certificate corresponding to the second request message is generated based on the obtained prepare message.

A specific process of generating the pre-prepare message based on the sequence number n+1 and the second request message may include: packaging the second request message to obtain a to-be-verified block, and determining a block hash value of the to-be-verified block as a block digest of the to-be-verified block; generating a pre-prepare identifier corresponding to the to-be-verified block, and determining the pre-prepare identifier, a first view number of the blockchain network, the sequence number n+1, and the block digest as to-be-signed pre-prepare information; signing the to-be-signed pre-prepare information by using a master node private key, to obtain third signature information; and generating the pre-prepare message that carries the third signature information and the to-be-verified block.

The prepare message carries fourth signature information and to-be-signed prepare information. The fourth signature information is generated by signing the to-be-signed prepare information using a backup node private key by a backup node that generates the prepare message. A specific process of generating the second prepared certificate corresponding to the second request message based on the obtained prepare message may include: performing, for each obtained prepare message, signature verification on the fourth signature information carried by the prepare message by using a backup node public key corresponding to the backup node that generates the prepare message, to obtain a signature verification result corresponding to the fourth signature information; checking the to-be-signed prepare information carried by the prepare message if the signature verification result corresponding to the fourth signature information is successful, to obtain a second check result; adding the prepare message to a log database if the second check result is successful; and combining, if the log database includes prepare messages respectively corresponding to 2f backup nodes, the pre-prepare message and the 2f prepare messages into the second prepared certificate corresponding to the second request message, f being a positive integer, f representing a maximum quantity of invalid backup nodes, 3f representing a total quantity of backup nodes having consensus permission in the blockchain network, and both the invalid backup nodes and the 2f backup nodes belonging to the 3f backup nodes.

The PBFT algorithm is a state machine replication algorithm that reaches a consensus based on a three-phase protocol. This embodiment of the present disclosure follows a pre-prepare phase and a prepare phase in the PBFT algorithm and removes a commit phase. In other words, this embodiment of the present disclosure completes a request operation of a request message in the prepare phase. Still refer to FIG. 3. The master node 30b packages the second request message to obtain a to-be-verified block 30d. The sequence number n+1 may be understood as a block height of the to-be-verified block 30d. The master node 30b determines a block hash value of the to-be-verified block 30d, and determines the block hash value as a block digest 301d of the to-be-verified block 30d. Further, the master node 30b generates a pre-prepare identifier corresponding to the to-be-verified block 30d, and determines the pre-prepare identifier, a first view number of the blockchain network, the sequence number n+1, and the block digest 301d as to-be-signed pre-prepare information 301e. Further, the master node 30b signs the to-be-signed pre-prepare information 301e by using a master node private key 301f, to obtain third signature information 302e. Further, the master node 30b generates the pre-prepare message 30g that carries the third signature information 302e and the to-be-verified block 30d. Further, the master node 30b stores the pre-prepare message 30g to a log database of the master node 30b.

The pre-prepare message 30g may be represented as the pre-prepare message $\langle\langle \text{PRE-PREPARE},v,n+1,d\rangle_{\sigma_p},m\rangle$, where PRE-PREPARE represents the pre-prepare identifier, v represents the first view number, m represents the to-be-verified block 30d, d represents the block digest 301d, and $\langle \text{PRE-PREPARE},v,n+1,d\rangle_{\sigma_p}$ represents the third signature information 302e.

Further, the master node 30b broadcasts the pre-prepare message 30g to 3f backup nodes, so that the 3f backup nodes separately check the pre-prepare message 30g. There may be an invalid backup node in the 3f backup nodes. The invalid backup node may not check the pre-prepare message 30g, and further may not generate the prepare message corresponding to the second request message, so that the invalid backup node does not return the prepare message corresponding to the second request message to the master node 30b. In some embodiments, the invalid backup node checks the pre-prepare message 30g, but generates a fault prepare message to disrupt subsequent processing on the second request message by the master node 30b.

The 3f backup nodes include at least 2f valid backup nodes. Processes of checking the pre-prepare message 30g respectively by the 2f valid backup nodes are the same, and processes of generating the prepare message corresponding to the second request message respectively by the 2f valid backup nodes are also the same. In this case, the following makes a description by using one valid backup node as an example, and for a processing process of another valid backup node, refer to the description below.

Figure 4:
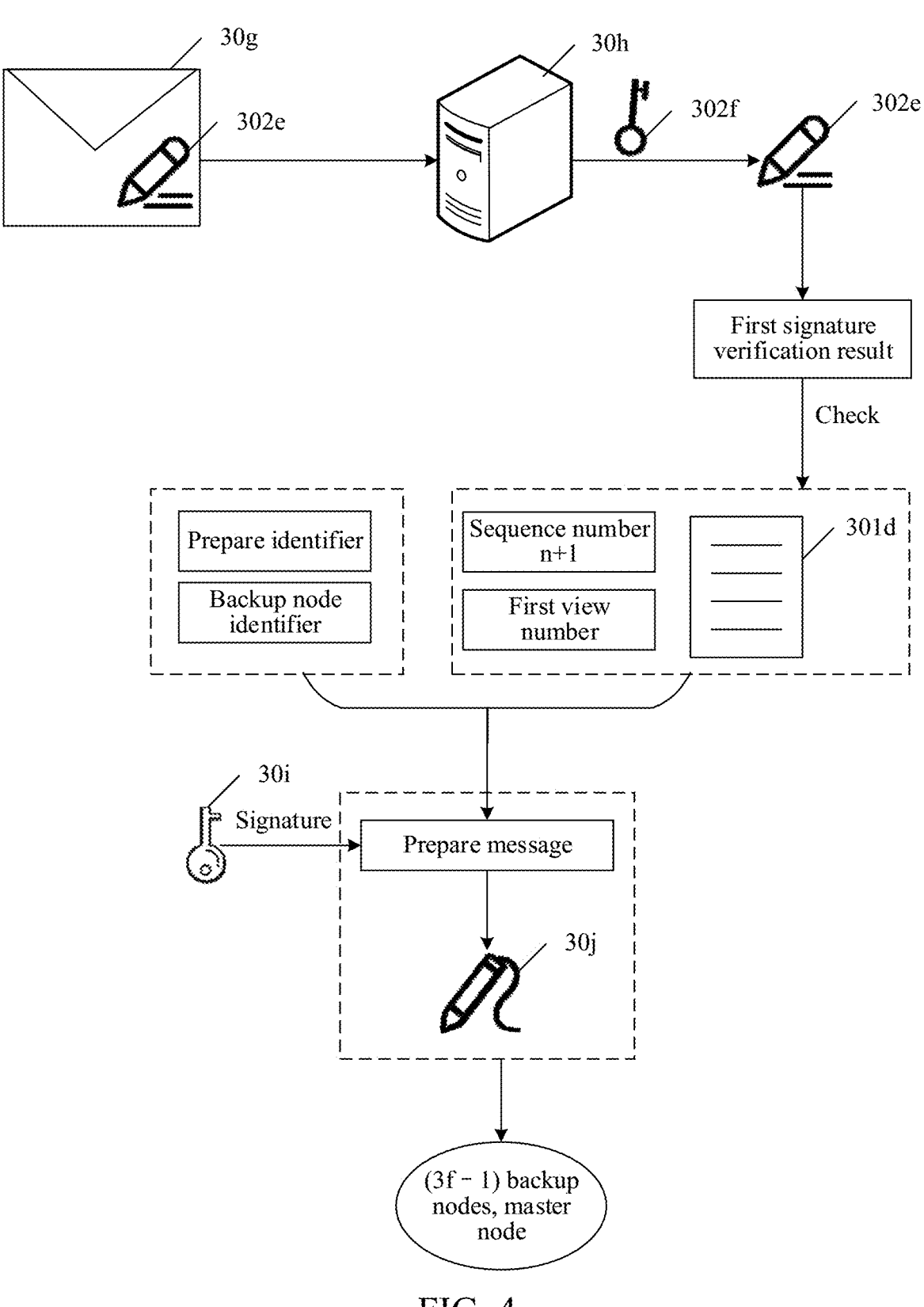
FIG. 4 is a schematic diagram of another blockchain-based data processing scenario according to an embodiment of the present disclosure.

With reference to FIG. 3 and FIG. 4, FIG. 4 is a schematic diagram of another blockchain-based data processing scenario according to an embodiment of the present disclosure. As shown in FIG. 4, a backup node 30h is any valid backup node in at least 2f valid backup nodes. The backup node 30h obtains the pre-prepare message 30g sent by the master node 30b. The backup node 30h first checks validity of the pre-prepare message 30g. In this case, signature verification is performed, using a master node public key 302f corresponding to the master node 30b, on the third signature information 302e carried by the pre-prepare message 30g, to obtain a first signature verification result. If the first signature verification result is successful, the backup node 30h determines that the pre-prepare message 30g is sent by the master node 30b. If the first signature verification result is failed, it is determined that the pre-prepare message 30g is not sent by the master node 30b. When the first signature verification result is successful, the backup node 30h checks the to-be-signed pre-prepare information 301e, which may specifically check whether the first view number is the same as a view number of the backup node 30h, check whether the sequence number n+1 already exists, and check whether the block digest 301d is the same as a block hash of a to-be-verified block 30d generated by the backup node 30h. If the first view number is the same as the view number of the backup node 30h, the sequence number n+1 does not exist, and the block digest 301d is the same as the block hash generated by the backup node 30h, the backup node 30h determines that a first check result is successful. Further, the backup node 30h obtains a prepare identifier for the to-be-verified block 30d and a backup node identifier of the backup node 30h, and determines the prepare identifier, the backup node identifier, the sequence number n+1, the first view number, and the block digest 301d as to-be-signed prepare information. The backup node 30h signs the to-be-signed prepare information using a backup node private key 30i of the backup node 30h to obtain fourth signature information 30j, generates prepare message that carries the fourth signature information 30j and the to-be-signed prepare information, and broadcasts the prepare message to the master node 30b and the remaining backup nodes, that is, (3f−1) backup nodes except the backup node 30h. In addition, the backup node 30h adds the prepare message to a log database of the backup node 30h. Each node has its corresponding log database.

The prepare message that carries the fourth signature information 30j and the to-be-signed prepare information may be represented as the prepare message $\langle\langle\text{PREPARE},\text{v}, \text{n}+1,\text{d},\text{i}\rangle_{o_i},\text{PREPARE},\text{v},\text{n}+1,\text{d},\text{i}\rangle$, where PREPARE represents the prepare identifier, i represents the backup node identifier of the backup node 30h, and $\langle\text{PREPARE},\text{v},\text{n}+1, \text{d},\text{i}\rangle_{o_i}$ represents the fourth signature information 30j.

The backup node 30h also obtains a prepare message sent by another backup node, and a subsequent processing process of the backup node 30h is the same as the subsequent processing process of the master node 30b, actually, a subsequent process of each valid backup node is the same as the subsequent process of the master node 30b. In this case, the following makes a description by using the master node 30b as an example, and for subsequent processing of at least 2f valid backup nodes, refer to the description below.

After obtaining the prepare message that carries the fourth signature information 30j and the to-be-signed prepare information and that is sent by the backup node 30h, the master node 30b first checks validity of the prepare message, and then performs signature verification on the fourth signature information 30j using a backup node public key corresponding to the backup node 30h, to obtain a signature verification result corresponding to the fourth signature information 30j (that is, a second signature verification result). If the second signature verification result is successful, the master node 30b determines that the prepare message is sent by the backup node 30h. If the second signature verification result is failed, it is determined that the prepare message is not sent by the backup node 30h. When the second signature verification result is successful, the master node 30b checks the prepare message sent by the backup node 30h, which may specifically check whether the view number in the prepare message is the same as the view number of the master node 30b (that is, the first view number), check whether serialization in the prepare message is the same as serialization of the master node 30b (that is, the sequence number n+1), and check whether the block digest in the prepare message is the same as the block digest of the master node 30b (that is, the block digest 301d). When the backup node 30h is a valid backup node, a check result of the prepare message by the master node 30b (that is, a second check result) is a second check success result. In this case, the master node 30b adds, to the log database of the master node 30b, the prepare message sent by the backup node 30h.

The master node 30b may obtain a prepare message sent by another valid backup node, and a processing process of the prepare message sent by another valid backup node is the same as the processing process of the prepare message sent by the backup node 30h. Details are not described herein again. If the log database of the master node 30b includes prepare messages respectively corresponding to 2f backup nodes, the master node 30b combines, into the second prepared certificate corresponding to the second request message, the pre-prepare message 30g generated by the master node 30b and the 2f prepare messages.

S103: Perform in parallel a request operation corresponding to the second request message while associatively storing the first request message and the first response result to the ledger file, to obtain a second response result corresponding to the second request message and store the second response result to a cache file.

When the second request message has the second prepared certificate, the master node may determine that the second request message is prepared. In this case, the master node skips the commit phase and performs in parallel the following three events: 1. assigning a sequence number n+2 to a third request message; 2. performing the request operation corresponding to the second request message to obtain the second response result corresponding to the second request message; and 3. associatively storing the first request message and the first response result. When the first request message has the first prepared certificate, the generation of the first response result is performed synchronously with assigning the sequence number n+1 to the second request message by the master node. The process of the master node performing the request operation corresponding to the second request message to obtain the second response result corresponding to the second request message may be understood as the master node "pre-executing" the second request message. This is because the second response result and the second request message are not persistently stored (that is, not written) to the ledger file, but are instead stored in the cache file. In this case, request status of the second request message changes to a request response state. When the third request message has a third prepared certificate, the master node associatively stores the second request message and the second response result to the ledger file persistently, that is, writes the second request message and the second response result to the ledger file. This process may be understood as the master node "finally executing" the second request message. In this case, the request status of the second request message changes to a request write state.

S104: Return, to a client, a first initial response message generated based on the second response result, for the client to determine a request execution result corresponding to the second request message based on the first initial response message and a backup initial response message returned by one or more backup nodes having consensus permission in a blockchain network.

Specifically, an initial response identifier for the second request message is generated based on the second response result; the initial response identifier, a first view number of the blockchain network, a request timestamp corresponding to the second request message, a client identifier corresponding to the client, a master node identifier, and the second response result are determined as to-be-signed initial response information; the to-be-signed initial response information is signed by using a master node private key, to obtain second signature information; and the first initial response message that carries the second signature information and the to-be-signed initial response information is generated, and the first initial response message is transmitted to the client, the second signature information causing the client to determine validity of the first initial response message.

Figure 5:
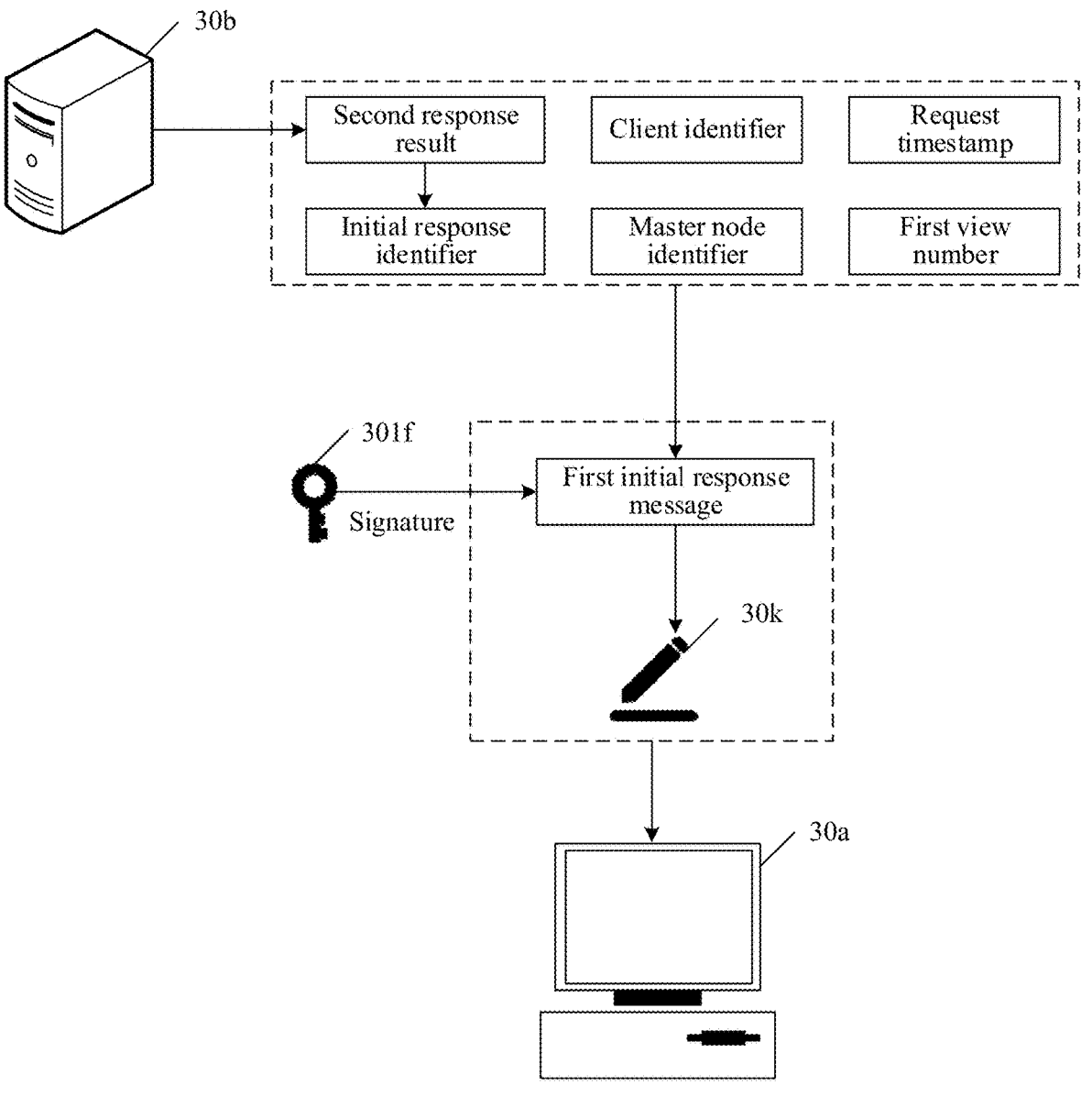
FIG. 5 is a schematic diagram of still another blockchain-based data processing scenario according to an embodiment of the present disclosure.

In this embodiment of the present disclosure, before the second request message and the second response result are persistently stored, the second response result is returned to the client that initiates the second request message. Refer to FIG. 5. FIG. 5 is a schematic diagram of still another blockchain-based data processing scenario according to an embodiment of the present disclosure. As shown in FIG. 5, after generating the second response result, the master node 30*b* generates an initial response identifier for the second request message, and further determines the initial response identifier, a first view number of the blockchain network, a request timestamp corresponding to the second request message, a client identifier corresponding to the client, a master node identifier, and the second response result as to-be-signed initial response information. The master node 30*b* signs the to-be-signed initial response information using the master node private key 301*f* to obtain second signature information 30*k*, and sends, to the terminal device 30*a* with the client installed, a first initial response message that carries the second signature information 30*k* and the to-be-signed initial response information. The second signature information 30*k* indicates the client to determine validity of the first initial response message.

The first initial response message that carries the second signature information 30*k* and the to-be-signed initial response information may be represented as the first initial response message $\langle\langle$ PRE-REPLY,v,t,c,i,r $\rangle_{o_i}$,PRE-REPLY, v,t,c,i,r $\rangle$, where PRE-REPLY represents the initial response identifier, t represents the request timestamp, c represents the client identifier, i represents the master node identifier, r represents the second response result, and $\langle$ PRE-REPLY,v, t,c,i,r $\rangle_{o_i}$ represents the second signature information 30*k*.

In addition, the client further receives an initial response message sent by a backup node. To distinguish from the first initial response message, the initial response message sent by the backup node is referred to as a backup initial response message. A process of the valid backup node generating the backup initial response message is the same as the process of the master node 30*b* generating the first initial response message. Subsequently, the client determines a first request execution result corresponding to the second request message based on the first initial response message and the backup initial response message. For an embodiment of this process, refer to a description in the embodiment corresponding to FIG. 7 below, and details are not described herein.

Figure 6:
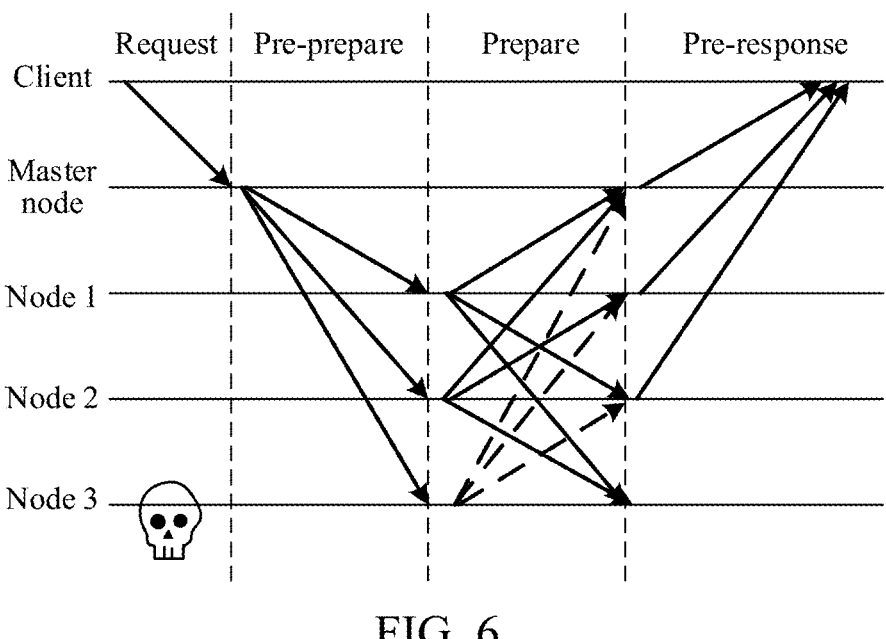
FIG. 6 is a schematic diagram of a scenario of a blockchain-based data processing method according to an embodiment of the present disclosure.

In conclusion, this embodiment of the present disclosure provides a PBFT algorithm improvement solution that can reduce a delay, which can remove a commit phase, so that a response delay of a client is reduced, and overall PBFT performance is improved due to the reduction of a quantity of times of network interaction for each consensus. For the procedure of this solution, refer to FIG. 6. FIG. 6 is a schematic diagram of a scenario of a blockchain-based data processing method according to an embodiment of the present disclosure. In the example of FIG. 6, f is equal to 1, so that a total quantity of backup nodes is 3. Three backup nodes are respectively a node 1, a node 2, and a node 3. In the example of FIG. 6, the node 3 is an invalid backup node, namely, a malicious node, and a master node, the node 1, and the node 2 are all valid nodes. First, the master node receives a second request message (a request in FIG. 6) initiated by a client. The master node requests and broadcasts the second request message to the backup nodes based on a two-phase protocol, which is specifically as follows.

Pre-prepare phase: The master node determines whether there is a first prepared certificate of a first request message with a sequence number n. If there is the first prepared certificate, a sequence number n+1 is assigned to the second request message. The master node broadcasts a pre-prepare message $\langle\langle$ PRE-PREPARE,v,n+1,d $\rangle_{o_p}$,m $\rangle$ to all the backup nodes, such as the node 1, the node 2, and the node 3 in FIG. 6.

Prepare phase: After receiving the pre-prepare message sent by the master node, the node 1 checks the pre-prepare message, accepts the pre-prepare message after the check is successful, writes the pre-prepare message to a log database, and enters the prepare phase. In this case, the node 1 broadcasts a prepare message $\langle\langle$ PREPARE,v,n+1,d,1 $\rangle_{o_1}$, PREPARE,v,n+1,d,1 $\rangle$ to all the nodes: the master node, the node 2, and the node 3, and writes the generated prepare message to a log database of the node 1. Subsequently, the node 1 also receives a prepare message $\langle\langle$ PREPARE,v,n+ 1,d,2 $\rangle_{o_2}$,PREPARE,v,n+1,d,2 $\rangle$ sent by the node 2, and writes the prepare message to the log database of the node 1 after a check is successful. When the log database of the node 1 includes one pre-prepare message and two (f=1) prepare messages that correspond to the second request message, the node 1 may determine that the second request message is prepared, and then combine the pre-prepare message and the two prepare messages into a second prepared certificate of the second request message. Further, the node 1 may "pre-execute" the second request message, that is, generate a second response result of the second request message, and send a backup initial response message 1 $\langle\langle$ PRE-REPLY,v,t,c,1,r $\rangle_{o_1}$,PRE-REPLY,v,t,c,1,r $\rangle$ to the client. In addition, the node 1 may "finally execute" the first request message, that is, persistently store the first request message and a first response result, in other words, write the first request message and the first response result to a ledger file of the node 1. The foregoing describes the prepare phase by using the node 1 as an example, and a processing process of the node 2 at the prepare phase is the same as that of the node 1. Details are not described herein again.

Refer to FIG. 7. FIG. 7 is another schematic flowchart of a blockchain-based data processing method according to an embodiment of the present disclosure. The blockchain-based data processing method may be performed by a master node having consensus permission in a blockchain network. As shown in FIG. 7, the method may include at least the following operations.

S201: Obtain a second request message, and determine request status of the second request message, where the second request message is initiated by a client.

Specifically, a request hash corresponding to the second request message is determined, and the request hash is compared with a cache request hash in the cache file, a request message corresponding to the cache request hash in the cache file being a request message for which a request operation has been performed; in response to the cache file includes a cache request hash that is the same as the request hash, it is determined that the request status of the second request message is the request response state; or in response to the cache file does not include a cache request hash that is the same as the request hash, the request hash is compared with a write request hash in the ledger file, a request message corresponding to the write request hash in the ledger file being a request message that has been stored; and in response to the ledger file includes a write request hash that is the same as the request hash, it is determined that the request status of the second request message is the request write state; or in response to the ledger file does not include a write request hash that is the same as the request hash, it is determined that the request status of the second request message is the request initial state.

In response to performing a request operation of the second request message to obtain a second response result, the master node stores the request hash of the second request message as the cache request hash into the cache file. In response to associatively storing the second request message and the second response result to the ledger file, the master node stores the request hash of the second request message as the write request hash into the ledger file.

The master node receives the second request message $\langle\langle$ REQUEST,o,t,c$\rangle_{\sigma_c}$ initiated by the client, where o is the request operation of the second request message, t is a request timestamp, which may be understood as a timestamp for initiating the second request message, c is a client identifier, and $\sigma_c$ is a signature for the second request message by the client.

Similarly, the master node first checks validity of the second request message based on the signature $\sigma_c$. If the second request message is a valid request message, the request hash corresponding to the second request message is generated, and then the request status of the second request message is determined based on the request hash. The master node needs to first determine request status of each obtained request message, and then determine a response result of the request message based on the request status corresponding to the request message. In this embodiment of the present disclosure, using the second request message as an example for description, the master node may first compare the request hash corresponding to the second request message with the cache request hash in the cache file of the master node. In response to the cache file includes a cache request hash that is the same as the request hash, it may be determined that the request status of the second request message is the request response state, and then the master node may determine that the second request message has been executed, and a response result corresponding to the second request message is the second response result stored in the cache file but not written to the ledger file of the master node. In response to the cache file does not include a cache request hash that is the same as the request hash, the master node compares the request hash with the write request hash in the ledger file of the master node. In response to the ledger file includes a write request hash that is the same as the request hash, it may be determined that the request status of the second request message is the request write state, and then the master node may determine that the second request message has been executed, and a response result corresponding to the second request message is the second response result that has been written to the ledger file of the master node. In response to the ledger file of the master node does not include a write request hash that is the same as the request hash, the master node may determine that the request status of the second request message is the request initial state.

Alternatively, the master node may first compare the request hash of the second request message with the write request hash in the ledger file of the master node. If the write request hash the same as the request hash does not exist in the ledger file, the request hash of the second request message is compared with a response request hash in the cache file of the master node. In some embodiments, the master node may further compare the request hash of the second request message with the response request hash in the cache file of the master node while comparing the request hash of the second request message with the write request hash in the ledger file of the master node.

S202: Obtain, in response to the request status being a request response state, the second response result corresponding to the second request message from the cache file, and return, to the client, a second initial response message generated based on the second response result, for the client to determine a second request execution result corresponding to the second request message based on the second initial response message and one or more backup initial response messages returned by one or more backup nodes, the request response state indicating that the second request message exists in the blockchain network and the request operation corresponding to the second request message has been performed.

Specifically, in response to the request status being the request response state, the master node may determine that the second request message is repeatedly sent by the client and that the client has not previously passed a first request execution result of the second request message. As the master node still has not written the second response result and the second request message to the ledger file, an embodiment of this operation is the same as the embodiment of the request status of the second request message being the request initial state, that is, an initial response message (namely, a second initial response message, which is different form a first initial response message in generation time) is returned to the client based on the second response result. A generation process of the second initial response message is the same as the generation process of the first initial response message in S104 in the embodiment corresponding to FIG. 2, and the difference lies in different generation time. The first initial response message is generated in a scenario where the request status is the request initial state, and the second initial response message is generated in a scenario where the request status is the request response state.

S203: Obtain, in response to the request status being a request write state, the second response result corresponding to the second request message from the ledger file, and return, to the client, a completed response message generated based on the second response result, for the client to determine a third request execution result corresponding to the second request message based on the completed response message and one or more backup completed response message returned by the one or more backup nodes, the request write state indicating that the second request message exists in the blockchain network and the second request message and the second response result have been associatively stored.

Specifically, a completed response identifier for the second request message is generated based on the second response result; the completed response identifier, a first view number of the blockchain network, a request timestamp corresponding to the second request message, a client identifier corresponding to the client, a master node identifier, and the second response result are determined as to-be-signed completed response information; the to-be-signed completed response information is signed by using a master node private key, to obtain first signature information; and the completed response message that carries the first signature information and the to-be-signed completed response information is generated and transmitted to the client, the first signature information causing the client to determine validity of the completed response message.

Specifically, in response to the request status being the request write state, the master node may determine that the second request message is repeatedly sent by the client and that the client has not previously passed a request execution result of the second request message. As the master node has written the second response result and the second request message, the completed response identifier for the second request message is generated based on the second response result. A subsequent process is similar to the process of the master node generating the initial response message. The master node first determines the completed response identifier, a first view number of the blockchain network, a request timestamp corresponding to the second request message, a client identifier corresponding to the client, a master node identifier, and the second response result as to-be-signed completed response information. Further, the master node signs the to-be-signed completed response information using the master node private key to obtain the first signature information, and then sends, to the client, the completed response message that carries the first signature information and the to-be-signed completed response information.

The completed response message that carries the first signature information and the to-be-signed completed response information may be represented as the completed response message $\langle\langle \text{REPLY,v,t,c,i,r}\rangle_{o_i}, \text{REPLY,v,t,c,i,r}\rangle$, where REPLY represents the completed response identifier, and $\langle\langle \text{REPLY,v,t,c,i,r}\rangle_{o_i}$ represents the first signature information.

In addition, the client further receives a completed response message sent by a backup node. To distinguish from the completed response message sent by the master node, the completed response message sent by the backup node is referred to as a backup completed response message. A process of the valid backup node generating the backup completed response message is the same as the process of the master node generating the completed response message.

The specific manner of the client determining the first request execution result of the second request message based on the first initial response message and the backup initial response message is the same as the specific manner of the client determining the second request execution result of the second request message based on the second initial response message and the backup initial response message, but the specific manner of the client determining the second request execution result of the second request message based on the second initial response message and the backup initial response message is different from the specific manner of the client determining the third request execution result of the second request message based on the completed response message and the backup completed response message. For details, refer to descriptions in embodiments respectively corresponding to FIG. 8 and FIG. 9 below.

S204: Assign, in response to the request status being a request initial state, in response to that a first request message with a sequence number n has a first prepared certificate, a sequence number n+1 to the second request message, the request initial state indicating that the second request message does not exist in the blockchain network, and n being a positive integer.

S205: Associatively store the first request message and a first response result corresponding to the first request message to the ledger file in response to that the second request message has a second prepared certificate.

S206: Perform in parallel a request operation corresponding to the second request message while associatively storing the first request message and the first response result to the ledger file, to obtain the second response result corresponding to the second request message and store the second response result to the cache file.

S207: Return, to the client, a first initial response message generated based on the second response result, for the client to determine a first request execution result corresponding to the second request message based on the first initial response message and a backup initial response message returned by a backup node having consensus permission in the blockchain network.

For the embodiment processes of S204 to S207, refer to S101 to S104 in the embodiment corresponding to FIG. 2 above, and details are not described herein again.

The following describes feasibility of this solution, and all nodes described below are nodes having consensus permission. Herein, it is only necessary to prove case 1: the client has received (2f+1) candidate initial responses for the second request message, or case 2: the client has received (f+1) candidate completed responses for the second request message, and finally the second request message is certain to be executed by all correct nodes in the same order. In other words, even if a view switch occurs and results in no execution of the second request message by some nodes, the second request message is also collected by a new master node, and re-enters the consensus using the same sequence number as the original second request message, so that the second request message can be executed by all nodes. This process may be referred to as "request replay". During a view switch, a manner of a new master node collecting a "to-be-replayed request" is as follows: Prepared certificates are collected from (2f+1) different nodes. A sequence number corresponding to a collected prepared certificate is greater than a sequence number of the latest request of a "stable checkpoint" of the new master node. The new master node "replays" request messages corresponding to all the collected prepared certificates. The stable checkpoint is a state in which correct nodes have reached a consensus in the PBFT algorithm, and the state is obtained by executing z request messages.

Before starting the proof, QC properties of the PBFT algorithm is first described, which are an important prerequisite for proving correctness of the PBFT algorithm. Q and C in the QC properties respectively stand for Quorum and Certificate. Quorum means an arbitration number, a quorum. In the PBFT algorithm, when a total node quantity is 3f+1, Quorum represents a set of nodes whose quantity is not less than 2f+1. Quorum certificate represents a set including a type of message from each node of a Quorum, which is referred to as a certificate, for example, a prepared certificate. Quorum has two important properties:

(Property 1) Intersectivity: Any two Quorums have at least one common correct node.

(Property 2) Availability: It is always possible to find a Quorum with no invalid nodes.

Case 1 (mostly): The client receives $(2f+1)$ same candidate initial responses corresponding to the second request message in a first request processing cycle of the second request message. This indicates that $(2f+1)$ nodes have prepared certificates of the second request message. If a master node also has a prepared certificate of the second request message, the master node may send a pre-prepare message with a sequence number n+1, and at least $2f$ other nodes may send prepare messages with the sequence number n+1, so that the second request message with the sequence number n+1 may be "pre-executed" by a node, that is, a request operation corresponding to the second request message is performed. In this case, the second request message may be finally executed by a node, that is, the second request message and a response result corresponding to the second request message are associatively stored. In addition, during a view switch, a new master node collects prepared certificates of $(2f+1)$ nodes. Based on the property 1 of Quorum, the two Quorums have at least one common correct node (namely, valid node). In this case, the prepared certificate of the second request message is certainly collected by the new master node, and therefore is certainly "replayed".

Case 2: The client receives (f+1) same candidate completed responses corresponding to the second request message in a second request processing cycle of the second request message. This indicates that at least one correct node "finally executes" the second request message, and it is sufficient to prove that the stored second request message is certainly "replayed". At a prepare phase, for a node, if the second request message is stored, a third request message with a sequence number n+2 has a third prepared certificate, that is, the node has received one pre-prepare message 3 and $2f$ prepare messages 3 of the third request message with the sequence number n+2. The node sends the pre-prepare message 3 or the prepare messages 3 with the sequence number n+2 only when the node already has the second prepared certificate of the second request message with the sequence number n+1. In this case, $(2f+1)$ nodes have the second prepared certificate of the second request message with the sequence number n+1. So far, the subsequent proof is shown in the case 1.

Refer to FIG. 8. FIG. 8 is another schematic flowchart of a blockchain-based data processing method according to an embodiment of the present disclosure. The blockchain-based data processing method may be performed by a client. As shown in FIG. 8, the method may include at least the following operations.

S301: Transmit a second request message to nodes having consensus permission in a blockchain network, for a master node in the nodes having consensus permission to perform the following operations: assigning, in response to that a first request message with a sequence number n has a first prepared certificate, a sequence number n+1 to the second request message, n being a positive integer; associatively storing the first request message and a first response result corresponding to the first request message to a ledger file in response to that the second request message has a second prepared certificate; performing in parallel a request operation corresponding to the second request message while associatively storing the first request message and the first response result to the ledger file, to obtain a second response result corresponding to the second request message and store the second response result to a cache file; and generating a first initial response message for the second request message based on the second response result.

For the embodiment process of S301, refer to S101 to S104 in the embodiment corresponding to FIG. 2 above, and S201 in the embodiment corresponding to FIG. 7 above. Details are not described herein again.

S302: Obtain the first initial response message returned by the master node, and determine a first request execution result corresponding to the second request message based on the first initial response message and a backup initial response message returned by a backup node having consensus permission in the blockchain network.

If the client first initiates the second request message to the blockchain network, the master node and at least $2f$ valid backup nodes in the blockchain network may respectively return generated initial response messages (including the first initial response message and the backup initial response message) to the client. A process of the client processing the first initial response message is the same as a process of the client processing each backup initial response message. In this case, this operation is described by using an example in which the client processes the first initial response message.

Specifically, the first initial response message carries second signature information and to-be-signed initial response information; the second signature information is obtained by the master node signing the to-be-signed initial response information using a master node private key; the to-be-signed initial response information includes an initial response identifier, a first view number of the blockchain network, a request timestamp corresponding to the second request message, a client identifier, a master node identifier corresponding to the master node, and the second response result; signature verification is performed on the second signature information using a master node public key corresponding to the master node private key, to obtain a signature verification result corresponding to the second signature information; if the signature verification result corresponding to the second signature information is successful, the request timestamp and the second response result are added as a candidate initial response De to a candidate initial response set corresponding to the initial response identifier; the candidate initial response set includes G candidate initial responses; the G candidate initial responses include the candidate initial response De, where e is a positive integer and e is less than or equal to $3f+1$, G is a positive integer and G is less than or equal to $3f+1$, 3f+1 represents a total quantity of nodes having consensus permission, and f represents a maximum quantity of invalid backup nodes in the nodes having consensus permission; and the first request execution result corresponding to the second request message is determined based on the candidate initial response set.

A specific process of determining the first request execution result corresponding to the second request message based on the candidate initial response set may include: determining, in a first request processing cycle if $(2f+1)$ same candidate initial responses exist in the candidate initial response set, that the first request execution result corresponding to the second request message is successful; or determining, if $(2f+1)$ same candidate initial responses do not exist in the candidate initial response set, that the first request execution result corresponding to the second request message is failed.

When checking that the first initial response message is a valid message, the client may add the request timestamp and the second response result in the first initial response message as a candidate initial response to the candidate initial response set. The candidate initial response set may include G candidate initial responses, and one candidate initial response corresponds to an initial response message of one node (master node or backup node). If $(2f+1)$ same candidate initial responses exist in the candidate initial response set in the first request processing cycle, that is, if $(2f+1)$ same request timestamps and $(2f+1)$ same response results exist, the client may determine that the first request execution result of the second request message is successful. If $(2f+1)$ same candidate initial responses do not exist in the candidate initial response set after the first request processing cycle, the client may determine that the first request execution result is failed. In this case, the client resends the second request message to the blockchain network. For an embodiment of this scenario, refer to a description in an embodiment corresponding to FIG. 9 below, and details are not described herein. The first request processing cycle may be understood as a waiting cycle for the client to determine a processing result of the first sent request message processed by the blockchain network.

Refer to FIG. 9. FIG. 9 is another schematic flowchart of a blockchain-based data processing method according to an embodiment of the present disclosure. The blockchain-based data processing method may be performed by a client. As shown in FIG. 9, the method may include at least the following operations.

S401: Transmit a second request message to nodes having consensus permission in a blockchain network, for a master node in the nodes having consensus permission to perform the following operations: assigning, in response to that a first request message with a sequence number n has a first prepared certificate, a sequence number n+1 to the second request message, n being a positive integer; associatively storing the first request message and a first response result corresponding to the first request message to a ledger file in response to that the second request message has a second prepared certificate, the first response result being obtained by performing an operation corresponding to the first request message in response to that the first request message has the first prepared certificate; performing in parallel a request operation corresponding to the second request message while associatively storing the first request message and the first response result to the ledger file, to obtain a second response result corresponding to the second request message and store the second response result to a cache file; and generating a first initial response message for the second request message based on the second response result.

S402: Obtain the first initial response message returned by the master node, and determine a first request execution result corresponding to the second request message based on the first initial response message and a backup initial response message returned by a backup node in the nodes having consensus permission in the blockchain network.

For the embodiment processes of S401 and S402, refer to S301 and S302 in the embodiment corresponding to FIG. 8 above, and details are not described herein again.

S403: Determine an updated timestamp corresponding to the second request message based on a first request processing cycle if the first request execution result is failed.

If the client does not receive $(2f+1)$ same candidate initial responses after the first request processing cycle, the master node resends the second request message at a time point corresponding to the updated timestamp. A time difference between the updated timestamp and the request timestamp is duration corresponding to the first request processing cycle.

S404: Retransmit the second request message at a time point corresponding to the updated timestamp to $(3f+1)$ nodes having consensus permission, for the $(3f+1)$ nodes having consensus permission to separately determine request status of the second request message and return an actual response result corresponding to the request status.

A node Ji determines an actual response result corresponding to the second request message based on a request state Hi of the second request message in the node Ji, and generates an actual response message based on the actual response result, where i is a positive integer and i is less than or equal to $3f+1$, the request state Hi belongs to $(3f+1)$ request states, and the node Ji is a node at which the request state Hi is located in the $(3f+1)$ nodes having consensus permission.

Specifically, after obtaining the repeatedly sent second request message, the master node broadcasts the second request message to all the nodes. A processing process of the master node obtaining the repeatedly sent second request message is the same as a processing process of a valid backup node obtaining the repeatedly sent second request message. In this case, this embodiment of the present disclosure uses the master node as an example for description. The master node first determines the request status of the second request message. For a specific process of determining the request status, refer to the description of S201 in the embodiment corresponding to FIG. 7 above. In response to the request status being a request response state, the actual response result is a second response result stored in a cache file, and the actual response message is a second initial response message. In response to the request status being a request completed state, the actual response result is a second response result stored in a ledger file, and the actual response message is a completed response message. In response to the request status being a request initial state, the actual response result is a second response result, and the actual response message is a first initial response message. The master node that receives the first sent second request message and the master node that receives the repeatedly sent second request message may be the same or may be different. For example, between two times of sending the second request message, the master node may switch over due to a failure or for other reasons, and the view changes.

S405: Obtain actual response messages returned respectively by a plurality of nodes having consensus permission, and determine a request update execution result corresponding to the second request message based on the actual response messages.

The request update execution result may be a second request execution result of the second request message determined based on a second initial response message returned by the master node and a backup initial response message returned by each backup node, or may be a third request execution result of the second request message determined based on a completed response message returned by the master node and a backup completed response message returned by each backup node.

Specifically, if the actual response message includes a completed response identifier, the updated timestamp in the actual response message and the actual response result are determined as a candidate completed response Ki; the candidate completed response Ki is added to a candidate completed response set corresponding to the completed response identifier, the candidate completed response set including L candidate completed responses, the L candidate completed responses including the candidate completed response Ki, L being a positive integer, and L being less than or equal to $3f+1$; and a third request execution result corresponding to the second request message is determined based on the candidate completed response set.

A specific process of determining the third request execution result corresponding to the second request message based on the candidate completed response set may include:

determining, in a second request processing cycle if (f+1) same candidate completed responses exist in the candidate completed response set, that the third request execution result corresponding to the second request message is successful; or determining, if (f+1) same candidate completed responses do not exist in the candidate completed response set, that the third request execution result corresponding to the second request message is failed.

Unlike the client can only obtain the first initial response message and the backup initial response message when first sending the second request message to the blockchain network, in the scenario of repeatedly sending the second request message to the blockchain network, the client may obtain the second initial response message returned by the master node, or may obtain the completed response message returned by the master node; and similarly, the client may obtain the backup initial response message returned by the backup node, or may obtain the backup completed response message returned by the backup node. If the second initial response message and the backup initial response message are obtained, a processing process of the client in the second request processing cycle is the same as a processing process of the client in the first request processing cycle, that is, it is necessary to collect (2f+1) same candidate initial responses. The candidate initial response set includes a candidate initial response collected in the first request processing cycle and a candidate initial response collected in the second request processing cycle. In addition, if two candidate initial responses of the same node are collected in the two request processing cycles, only one candidate initial response is retained, that is, different candidate initial responses correspond to different nodes. If the completed response message and the backup completed response message are obtained, the client needs to collect (f+1) same candidate completed responses in the second request processing cycle.

The client may further obtain the completed response message while obtaining the initial response message (for example, the second initial response message). In this case, the client may generate the candidate initial response set corresponding to the initial response identifier and the candidate completed response set corresponding to the completed response identifier. In the second request processing cycle, if one of the two sets meets a condition, for example, if the candidate initial response set includes (2f+1) same candidate initial responses, the client may determine that the second request execution result of the second request message is successful; or if the candidate completed response set includes (f+1) same candidate completed responses, the client may determine that the third request execution result of the second request message is successful. If neither set meets the condition, after the second request processing cycle, the client determines that both the second request execution result and the third request execution result are failed. When both the second request execution result and the third request execution result are failed, the client may resend the second request message to the blockchain network.

Based on the above, in this embodiment of the present disclosure, the consensus starts for the second request message when the first request message has the first prepared certificate, without waiting for performing the request operation corresponding to the first request message. Therefore, consensus efficiency of the blockchain network can be improved. In addition, in this embodiment of the present disclosure, when the second request message has the second prepared certificate, the commit phase for the second request message is skipped, the first request message and the first response result are associatively stored, and the request operation corresponding to the second request message is performed. Apparently, this embodiment of the present disclosure performs the storage of the first request message and the execution of the second request message in parallel, and removes the commit phase, so that a response delay of the client can be reduced. In addition, as a quantity of times of network interaction for each consensus is reduced, consensus efficiency of the blockchain network is further improved. Moreover, in this embodiment of the present disclosure, the first initial response message is sent to the client when the second response result is generated, so that the client can determine the request execution result of the second request message without waiting for the storage of the second response result. Therefore, efficiency of the client for determining the request execution result can be improved.

Figure 10:
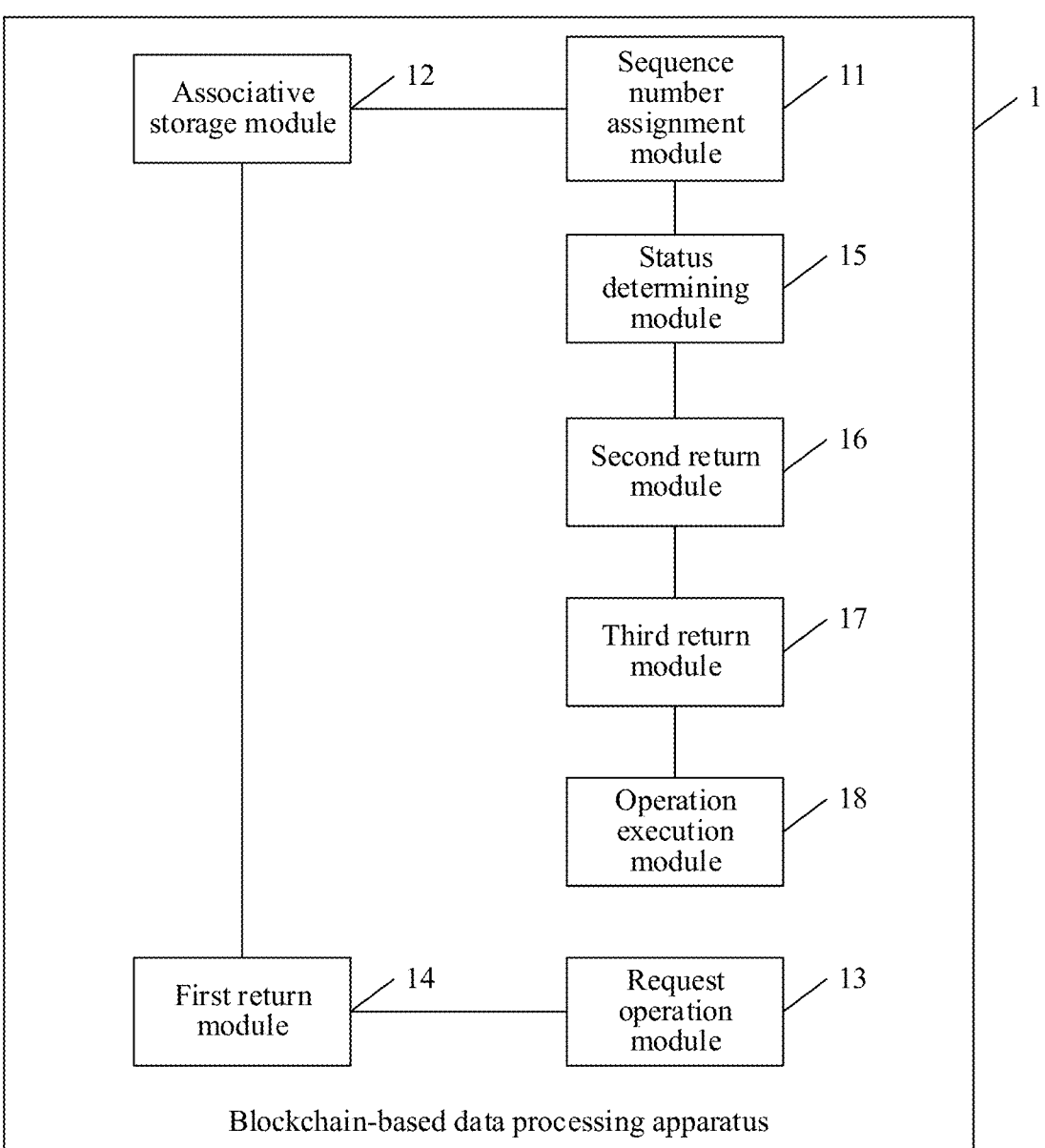
FIG. 10 is a schematic diagram of a structure of a blockchain-based data processing apparatus according to an embodiment of the present disclosure.

Further, refer to FIG. 10. FIG. 10 is a schematic diagram of a structure of a blockchain-based data processing apparatus according to an embodiment of the present disclosure. The blockchain-based data processing apparatus may be run in a master node having consensus permission in a blockchain network. The blockchain-based data processing apparatus 1 may be configured to perform corresponding operations in the method provided in the embodiments of the present disclosure. As shown in FIG. 10, the blockchain-based data processing apparatus 1 may include: a sequence number assignment module 11, an associative storage module 12, a request operation module 13, and a first return module 14.

The sequence number assignment module 11 is configured to assign, in response to that a first request message with a sequence number n has a first prepared certificate, a sequence number n+1 to a second request message, n being a positive integer.

The associative storage module 12 is configured to associatively store the first request message and a first response result corresponding to the first request message to a ledger file in response to that the second request message has a second prepared certificate.

The request operation module 13 is configured to perform in parallel a request operation corresponding to the second request message while associatively storing the first request message and the first response result to the ledger file, to obtain a second response result corresponding to the second request message and store the second response result to a cache file.

The first return module 14 is configured to return, to a client that initiates the second request message, a first initial response message generated based on the second response result, for the client to determine a first request execution result corresponding to the second request message based on the first initial response message and a backup initial response message returned by each backup node having consensus permission in a blockchain network.

For specific functional implementations of the sequence number assignment module 11, the associative storage module 12, the request operation module 13, and the first return module 14, refer to S101 to S104 in the embodiment corresponding to FIG. 2 above, and details are not described herein again.

Still refer to FIG. 10. The blockchain-based data processing apparatus 1 may further include: a status determining module 15, a second return module 16, a third return module 17, and an operation execution module 18.

The status determining module 15 is configured to obtain the second request message, and determine request status of the second request message.

The second return module 16 is configured to obtain, in response to the request status being a request response state, the second response result corresponding to the second request message from the cache file, and return, to the client, a second initial response message generated based on the second response result, for the client to determine a second request execution result corresponding to the second request message based on the second initial response message and a backup initial response message returned by a backup node having consensus permission in the blockchain network, the request response state indicating that the second request message exists in the blockchain network and the master node has performed the request operation corresponding to the second request message to obtain the second response result and store the second response result to the cache file.

The third return module 17 is configured to obtain, in response to the request status being a request write state, the second response result corresponding to the second request message from the ledger file, and return, to the client, a completed response message generated based on the second response result, for the client to determine a third request execution result corresponding to the second request message based on the completed response message and a backup completed response message returned by a backup node having consensus permission in the blockchain network, the request write state indicating that the second request message exists in the blockchain network and the master node has associatively stored the second request message and the second response result to the ledger file.

The operation execution module 18 is configured to perform, in response to the request status being a request initial state, the operation of assigning, in response to that a first request message with a sequence number n has a first prepared certificate, a sequence number n+1 to a second request message, the request initial state indicating that the second request message does not exist in the blockchain network.

For specific functional implementations of the status determining module 15, the second return module 16, the third return module 17, and the operation execution module 18, refer to S201 to S204 in the embodiment corresponding to FIG. 7 above, and details are not described herein again.

Figure 11:
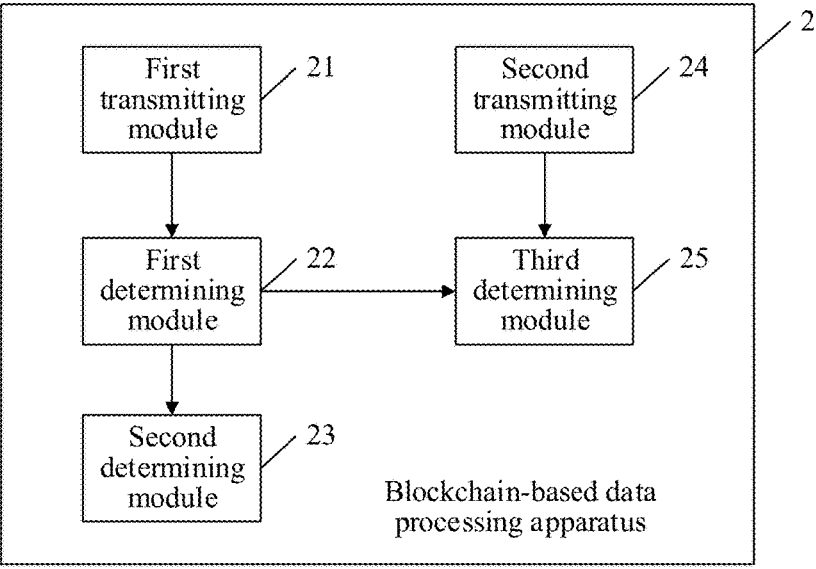
FIG. 11 is a schematic diagram of another structure of a blockchain-based data processing apparatus according to an embodiment of the present disclosure.

Further, refer to FIG. 11. FIG. 11 is a schematic diagram of another structure of a blockchain-based data processing apparatus according to an embodiment of the present disclosure. The blockchain-based data processing apparatus 2 may be run in a client. The apparatus may be configured to perform corresponding operations in the method provided in the embodiments of the present disclosure. As shown in FIG. 11, the blockchain-based data processing apparatus 2 may include: a first transmitting module 21 and a first determining module 22.

The first transmitting module 21 is configured to transmit a second request message to nodes having consensus permission in a blockchain network, for a master node in the nodes having consensus permission to perform the following operations: assigning, in response to that a first request message with a sequence number n has a first prepared certificate, a sequence number n+1 to the second request message, n being a positive integer; associatively storing the first request message and a first response result corresponding to the first request message to a ledger file in response to that the second request message has a second prepared certificate; performing in parallel a request operation corresponding to the second request message while associatively storing the first request message and the first response result to the ledger file, to obtain a second response result corresponding to the second request message and store the second response result to a cache file; and generating a first initial response message for the second request message based on the second response result.

The first determining module 22 is configured to obtain the first initial response message returned by the master node, and determine a request execution result corresponding to the second request message based on the first initial response message and a backup initial response message returned by a backup node in the nodes having consensus permission in the blockchain network.

For specific functional implementations of the first transmitting module 21 and the first determining module 22, refer to S301 and S302 in the embodiment corresponding to FIG. 8 above, and details are not described herein again.

Still refer to FIG. 11. The blockchain-based data processing apparatus 2 may further include: a second determining module 23, a second transmitting module 24, and a third determining module 25.

The second determining module 23 is configured to determine an updated timestamp corresponding to the second request message based on a first request processing cycle if the request execution result is failed.

The second transmitting module 24 is configured to retransmit the second request message at a time point corresponding to the updated timestamp to $(3f+1)$ nodes having consensus permission, for the $(3f+1)$ nodes having consensus permission to separately determine request status of the second request message, a request state Hi causing a node Ji to determine an actual response result corresponding to the second request message, the actual response result causing the node Ji to generate an actual response message, i being a positive integer, i being less than or equal to $3f+1$, the request state Hi belonging to $(3f+1)$ request states, and the node Ji being a node at which the request state Hi is located in the $(3f+1)$ nodes having consensus permission.

The third determining module 25 is configured to obtain the actual response message returned by the node Ji, and determine a request update execution result corresponding to the second request message based on the actual response message.

For specific functional implementations of the second determining module 23, the second transmitting module 24, and the third determining module 25, refer to S403 and S405 in the embodiment corresponding to FIG. 9 above, and details are not described herein again.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 12:
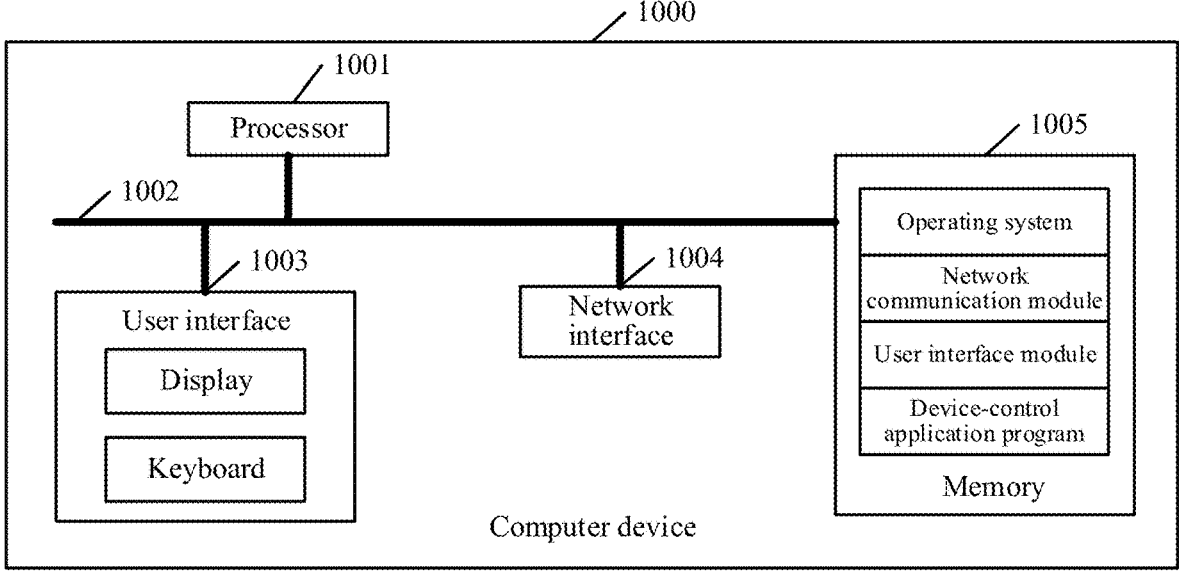
FIG. 12 is a schematic diagram of a structure of a computer device according to an embodiment of the present disclosure.

Further, refer to FIG. 12. FIG. 12 is a schematic diagram of a structure of a computer device according to an embodiment of the present disclosure. As shown in FIG. 12, the computer device 1000 may include: at least one processor 1001, for example, a CPU, at least one network interface 1004, a user interface 1003, a memory 1005, and at least one communication bus 1002. The communication bus 1002 is configured to implement connection and communication between these components. In some embodiments, the user interface 1003 may include a display and a keyboard, and the network interface 1004 may include a standard wired interface and a wireless interface (for example, a Wi-Fi interface). The memory 1005 may be a high-speed RAM memory, or may be a non-volatile memory, for example, at least one magnetic disk memory. The memory 1005 may alternatively be at least one storage apparatus located away from the processor 1001. As shown in FIG. 12, the memory 1005 used as a computer storage medium may include an operating system, a network communication module, a user interface module, and a device-control application program.

In the computer device 1000 shown in FIG. 12, the network interface 1004 may provide a network communication function; the user interface 1003 is mainly configured to provide an input interface for a user; and the processor 1001 may be configured to call the device-control application program stored in the memory 1005, to implement:

assigning, in response to that a first request message with a sequence number n has a first prepared certificate, a sequence number n+1 to a second request message, n being a positive integer;

associatively storing the first request message and a first response result corresponding to the first request message to a ledger file in response to that the second request message has a second prepared certificate, the first response result being obtained by performing an operation corresponding to the first request message in response to that the first request message has the first prepared certificate; performing in parallel a request operation corresponding to the second request message while associatively storing the first request message and the first response result to the ledger file, to obtain a second response result corresponding to the second request message and store the second response result to a cache file; and returning, to a client, a first initial response message generated based on the second response result, for the client to determine a first request execution result corresponding to the second request message based on the first initial response message and a backup initial response message returned by each backup node having consensus permission in a blockchain network.

Alternatively, the processor 1001 may be configured to call the device-control application program stored in the memory 1005, to implement:

transmitting a second request message to nodes having consensus permission in a blockchain network, for a master node in the nodes having consensus permission to perform the following operations: assigning, in response to that a first request message with a sequence number n has a first prepared certificate, a sequence number n+1 to the second request message, n being a positive integer; associatively storing the first request message and a first response result corresponding to the first request message to a ledger file in response to that the second request message has a second prepared certificate; performing in parallel a request operation corresponding to the second request message while associatively storing the first request message and the first response result to the ledger file, to obtain a second response result corresponding to the second request message and store the second response result to a cache file; generating a first initial response message for the second request message based on the second response result; and obtaining the first initial response message returned by the master node, and determining a first request execution result corresponding to the second request message based on the first initial response message and a backup initial response message returned by a backup node having consensus permission in the blockchain network.

The computer device 1000 described in this embodiment of the present disclosure may implement the description of the blockchain-based data processing method or apparatus in the foregoing embodiments, and details are not described herein again. In addition, beneficial effects of the same method are not described herein again.

An embodiment of the present disclosure further provides a computer-readable storage medium. The computer-readable storage medium stores a computer program. The computer program is executed by a processor to implement the description of the blockchain-based data processing method or apparatus in the foregoing embodiments, and details are not described herein again. In addition, beneficial effects of the same method are not described herein again.

The computer-readable storage medium may be an internal storage unit of the blockchain-based data processing apparatus provided in any one of the foregoing embodiments and the foregoing computer device, for example, a hard disk or an internal memory of the computer device. The computer-readable storage medium may alternatively be an external storage device of the computer device. For example, a plug-in hard disk, a smart media card (SMC), a secure digital (SD) card, a flash card, or the like that is equipped on the computer device. Further, the computer-readable storage medium may include both the internal storage unit and the external storage device of the computer device. The computer-readable storage medium is configured to store the computer program and another program and data required for the computer device. The computer-readable storage medium may be further configured to temporarily store data that has been outputted or that is to be outputted.

An embodiment of the present disclosure further provides a computer program product. The computer program product includes a computer program. The computer program is stored in a computer-readable storage medium. A processor of a computer device reads the computer program from the computer-readable storage medium. The processor executes the computer program to enable the computer device to implement the description of the blockchain-based data processing method or apparatus in the foregoing embodiments, and details are not described herein again. In addition, beneficial effects of the same method are not described herein again.

In the specification, claims, and accompanying drawings of the embodiments of the present disclosure, the terms "first", "second", and the like are intended to distinguish different objects and are not intended to describe a specific sequence. In addition, the terms "include" and any variant thereof are intended to cover a non-exclusive inclusion. For example, a process, method, apparatus, product, or device that includes a series of operations or units is not limited to the listed operations or modules, and further includes an operation or a module that is not listed, or further includes another operation or unit that is intrinsic to the process, method, apparatus, product, or device.

A person of ordinary skill in the art may be aware that, units and algorithm operations of the examples described in the embodiments disclosed in this specification can be implemented by electronic hardware, computer software, or a combination thereof. To clearly describe the interchangeability between the hardware and the software, the foregoing has generally described compositions and operations of each example based on functions. Whether the functions are performed by hardware or software depends on particular applications and design constraints of the technical solutions. A person skilled in the art may use different methods to implement the described functions for each particular application, but it is not to be considered that the implementation goes beyond the scope of the present disclosure.

The foregoing descriptions are merely exemplary embodiments of the present disclosure, but are not intended to limit the present disclosure. Any modification, equivalent replacement, or improvement made without departing from the principle of the present disclosure shall fall within the protection scope of the present disclosure.

What is claimed is:

1. A blockchain-based data processing method, a blockchain network comprising a master node having consensus permission and one or more backup nodes having the consensus permission, the method being performed by the master node and comprising:

assigning, in response to a first request message having a sequence number n and a first prepared certificate, a sequence number n+1 to a second request message, n being a positive integer;

associatively storing the first request message and a first response result corresponding to the first request message to a ledger file in response to the second request message having a second prepared certificate, the first response result being obtained by performing an operation corresponding to the first request message in response to the first request message having the first prepared certificate; performing in parallel a request operation corresponding to the second request message while associatively storing the first request message and the first response result to the ledger file, to obtain a second response result corresponding to the second request message and store the second response result to a cache file; and returning, to a client that initiates the second request message, a first initial response message generated based on the second response result, for the client to determine a first request execution result corresponding to the second request message based on the first initial response message and a backup initial response message returned by each of the one or more backup nodes.

2. The method according to claim 1, further comprising:

obtaining the second request message, and determining request status of the second request message; and obtaining, in response to the request status being a request response state, the second response result corresponding to the second request message from the cache file, and returning, to the client, a second initial response message generated based on the second response result, for the client to determine a second request execution result corresponding to the second request message based on the second initial response message and a backup initial response message returned by the each of the one or more backup nodes, the request response state indicating that the second request message exists in the blockchain network and the master node has performed the request operation corresponding to the second request message;

obtaining, in response to the request status being a request write state, the second response result corresponding to the second request message from the ledger file, and returning, to the client, a completed response message generated based on the second response result, for the client to determine a third request execution result corresponding to the second request message based on the completed response message and a backup completed response message returned by the each of the one or more backup nodes, the request write state indicating that the second request message exists in the blockchain network and the master node has associatively stored the second request message and the second response result to the ledger file; and performing, in response to the request status being a request initial state, the operation of assigning the sequence number n+1 to the second request message, the request initial state indicating that the second request message does not exist in the blockchain network.

3. The method according to claim 2, wherein the determining the request status of the second request message comprises:

determining a request hash corresponding to the second request message, and comparing the request hash with a cache request hash in the cache file, a request message corresponding to the cache request hash in the cache file being a request message for which a request operation has been performed;

determining, in response to the cache file including a cache request hash that is the same as the request hash, that the request status of the second request message is the request response state;

comparing, in response to the cache file not including a cache request hash that is the same as the request hash, the request hash with a write request hash in the ledger file, a request message corresponding to the write request hash in the ledger file being a request message that has been stored;

determining, in response to the ledger file including a write request hash that is the same as the request hash, that the request status of the second request message is the request write state; and determining, in response to the ledger file not including a write request hash that is the same as the request hash, that the request status of the second request message is the request initial state.

4. The method according to claim 2, wherein the returning, to the client, the completed response message generated based on the second response result comprises:

generating a completed response identifier for the second request message based on the second response result;

determining the completed response identifier, a first view number of the blockchain network, a request timestamp corresponding to the second request message, a client identifier corresponding to the client, a master node identifier, and the second response result as to-be-signed completed response information;

signing the to-be-signed completed response information by using a master node private key, to obtain first signature information; and generating the completed response message that carries the first signature information and the to-be-signed completed response information, and transmitting the completed response message to the client, the first signature information causing the client to determine validity of the completed response message.

5. The method according to claim 1, wherein the returning, to the client, the first initial response message generated based on the second response result comprises:

generating an initial response identifier for the second request message based on the second response result;

determining the initial response identifier, a first view number of the blockchain network, a request timestamp corresponding to the second request message, a client identifier corresponding to the client, a master node identifier, and the second response result as to-be-signed initial response information;

signing the to-be-signed initial response information by using a master node private key, to obtain second signature information; and generating the first initial response message that carries the second signature information and the to-be-signed initial response information, and transmitting the first initial response message to the client, the second signature information causing the client to determine validity of the first initial response message.

6. The method according to claim 1, wherein generating the second prepared certificate corresponding to the second request message comprises:

generating a pre-prepare message based on the sequence number n+1 assigned to the second request message and the second request message;

broadcasting the pre-prepare message to the one or more backup nodes, for the one or more backup nodes to check the pre-prepare message to obtain a first check result, the first check result causing the backup node to generate, in response to the first check result being successful, a prepare message corresponding to the second request message; and obtaining the prepare message returned by the one or more backup nodes, and generating the second prepared certificate corresponding to the second request message based on the obtained prepare message.

7. The method according to claim 6, wherein the generating a pre-prepare message based on the sequence number n+1 assigned to the second request message and the second request message comprises:

packaging the second request message to obtain a to-be-verified block, and determining a block hash value of the to-be-verified block as a block digest of the to-be-verified block;

generating a pre-prepare identifier corresponding to the to-be-verified block, and determining the pre-prepare identifier, a first view number of the blockchain network, the sequence number n+1, and the block digest as to-be-signed pre-prepare information;

signing the to-be-signed pre-prepare information by using a master node private key, to obtain third signature information; and generating the pre-prepare message that carries the third signature information and the to-be-verified block.

8. The method according to claim 6, wherein the prepare message carries fourth signature information; the fourth signature information is generated by signing the prepare message using a backup node private key by a backup node that generates the prepare message; and the generating the second prepared certificate corresponding to the second request message based on the obtained prepare message comprises:

for a prepare message:

performing signature verification on the fourth signature information carried by the prepare message by using a backup node public key corresponding to the backup node that generates the prepare message, to obtain a signature verification result corresponding to the fourth signature information;

checking the prepare message in response to the signature verification result corresponding to the fourth signature information being successful, to obtain a second check result;

adding the prepare message to a log database in response to the second check result being successful; and combining, in response to the log database comprising prepare messages respectively corresponding to 2f backup nodes, the pre-prepare message and the 2f prepare messages into the second prepared certificate corresponding to the second request message, the 2f backup nodes belonging to 3f backup nodes, f being a positive integer, f representing a maximum quantity of invalid backup nodes, 3f representing a total quantity of backup nodes having consensus permission in the blockchain network, and both the invalid backup nodes and the 2f backup nodes belonging to the 3f backup nodes.

9. A blockchain-based data processing method, the method being performed by a client, and the method comprising:

transmitting a second request message to nodes having consensus permission in a blockchain network, for a master node in the nodes having consensus permission to perform the following operations: assigning, in response to a first request message with a sequence number n having a first prepared certificate, a sequence number n+1 to the second request message, n being a positive integer; associatively storing the first request message and a first response result corresponding to the first request message to a ledger file in response to the second request message having a second prepared certificate, the first response result being obtained by performing an operation corresponding to the first request message in response to the first request message having the first prepared certificate;

performing in parallel a request operation corresponding to the second request message while associatively storing the first request message and the first response result to the ledger file, to obtain a second response result corresponding to the second request message and store the second response result to a cache file; generating a first initial response message for the second request message based on the second response result; and obtaining the first initial response message returned by the master node, and determining a first request execution result corresponding to the second request message based on the first initial response message and a backup initial response message returned by a backup node in the nodes having consensus permission in the blockchain network.

10. The method according to claim 9, wherein the first initial response message and the backup initial response message carry to-be-signed initial response information, and the to-be-signed initial response information comprises a request timestamp of the second request message and the second response result; and the determining the first request execution result corresponding to the second request message based on the first initial response message and the backup initial response message returned by the backup node in the nodes having consensus permission in the blockchain network comprises:

performing signature verification on the first initial response message to obtain a signature verification result corresponding to the first initial response message, and adding, to a candidate initial response set corresponding to an initial response identifier in response to the signature verification result of the first initial response message being successful, the request timestamp of the second request message and the second response result as a candidate initial response;

performing signature verification on the backup initial response message to obtain a signature verification result corresponding to the backup initial response message, and adding, to the candidate initial response set corresponding to the initial response identifier in response to the signature verification result corresponding to the backup initial response message being successful, the request timestamp and the second response result as a candidate initial response; and determining the first request execution result corresponding to the second request message based on the candidate initial response set.

11. The method according to claim 10, wherein the determining the first request execution result corresponding to the second request message based on the candidate initial response set comprises:

determining, in a first request processing cycle in response to (2f+1) same candidate initial responses existing in the candidate initial response set, that the first request execution result corresponding to the second request message is successful; and determining, in response to (2f+1) same candidate initial responses not existing in the candidate initial response set, that the first request execution result corresponding to the second request message is unsuccessful.

12. The method according to claim 11, further comprising:

determining an updated timestamp corresponding to the second request message based on the first request processing cycle in response to the first request execution result being unsuccessful;

retransmitting the second request message at a time point corresponding to the updated timestamp to (3f+1) nodes having consensus permission, for the (3f+1) nodes having consensus permission to separately determine request status of the second request message, a request state Hi causing a node Ji to determine an actual response result corresponding to the second request message, the actual response result causing the node Ji to generate an actual response message, i being a positive integer, i being less than or equal to 3f+1, the request state Hi belonging to (3f+1) request states, and the node Ji being a node at which the request state Hi is located in the (3f+1) nodes having consensus permission; and obtaining the actual response message returned by the node Ji, and determining a request update execution result corresponding to the second request message based on the actual response message.

13. The method according to claim 12, wherein the determining the request update execution result corresponding to the second request message based on the actual response message comprises:

determining the request timestamp of the second request message and the actual response result as a candidate completed response in response to the actual response message comprising a completed response identifier;

adding the candidate completed response to a candidate completed response set corresponding to the completed response identifier, the candidate completed response set comprising L candidate completed responses, L being a positive integer, and L being less than or equal to 3f+1; and determining a third request execution result corresponding to the second request message based on the candidate completed response set.

14. The method according to claim 13, wherein the determining a third request execution result corresponding to the second request message based on the candidate completed response set comprises:

determining, in a second request processing cycle in response to (f+1) same candidate completed responses existing in the candidate completed response set, that the third request execution result corresponding to the second request message is successful; and determining, in response to (f+1) same candidate completed responses not existing in the candidate completed response set, that the third request execution result corresponding to the second request message is unsuccessful.

15. A non-transitory computer-readable storage medium, the computer-readable storage medium storing a computer program, and the computer program being adapted to be loaded and executed by a processor, to enable the processor of a master node to perform:

assigning, in response to a first request message having a sequence number n and a first prepared certificate, a sequence number n+1 to a second request message, n being a positive integer;

associatively storing the first request message and a first response result corresponding to the first request message to a ledger file in response to the second request message having a second prepared certificate, the first response result being obtained by performing an operation corresponding to the first request message in response to the first request message having the first prepared certificate; performing in parallel a request operation corresponding to the second request message while associatively storing the first request message and the first response result to the ledger file, to obtain a second response result corresponding to the second request message and store the second response result to a cache file; and returning, to a client that initiates the second request message, a first initial response message generated based on the second response result, for the client to determine a first request execution result corresponding to the second request message based on the first initial response message and a backup initial response message returned by each of the one or more backup nodes.

16. The storage medium according to claim 15, wherein the computer program further causes the processor to perform:

obtaining the second request message, and determining request status of the second request message; and obtaining, in response to the request status being a request response state, the second response result corresponding to the second request message from the cache file, and returning, to the client, a second initial response message generated based on the second response result, for the client to determine a second request execution result corresponding to the second request message based on the second initial response message and a backup initial response message returned by the each of the one or more backup nodes, the request response state indicating that the second request message exists in the blockchain network and the master node has performed the request operation corresponding to the second request message;

obtaining, in response to the request status being a request write state, the second response result corresponding to the second request message from the ledger file, and returning, to the client, a completed response message generated based on the second response result, for the client to determine a third request execution result corresponding to the second request message based on the completed response message and a backup completed response message returned by the each of the one or more backup nodes, the request write state indicating that the second request message exists in the blockchain network and the master node has associatively stored the second request message and the second response result to the ledger file; and performing, in response to the request status being a request initial state, the operation of assigning the sequence number n+1 to the second request message, the request initial state indicating that the second request message does not exist in the blockchain network.

17. The storage medium according to claim 16, wherein the determining the request status of the second request message comprises:

determining a request hash corresponding to the second request message, and comparing the request hash with a cache request hash in the cache file, a request message corresponding to the cache request hash in the cache file being a request message for which a request operation has been performed;

determining, in response to the cache file including a cache request hash that is the same as the request hash, that the request status of the second request message is the request response state;

comparing, in response to the cache file not including a cache request hash that is the same as the request hash, the request hash with a write request hash in the ledger file, a request message corresponding to the write request hash in the ledger file being a request message that has been stored;

determining, in response to the ledger file including a write request hash that is the same as the request hash, that the request status of the second request message is the request write state; and determining, in response to the ledger file not including a write request hash that is the same as the request hash, that the request status of the second request message is the request initial state.

18. The storage medium according to claim 16, wherein the returning, to the client, the completed response message generated based on the second response result comprises:

generating a completed response identifier for the second request message based on the second response result;

determining the completed response identifier, a first view number of the blockchain network, a request timestamp corresponding to the second request message, a client identifier corresponding to the client, a master node identifier, and the second response result as to-be-signed completed response information;

signing the to-be-signed completed response information by using a master node private key, to obtain first signature information; and generating the completed response message that carries the first signature information and the to-be-signed completed response information, and transmitting the completed response message to the client, the first signature information causing the client to determine validity of the completed response message.

19. The storage medium according to claim 15, wherein the returning, to the client, the first initial response message generated based on the second response result comprises:

generating an initial response identifier for the second request message based on the second response result;

determining the initial response identifier, a first view number of the blockchain network, a request timestamp corresponding to the second request message, a client identifier corresponding to the client, a master node identifier, and the second response result as to-be-signed initial response information;

signing the to-be-signed initial response information by using a master node private key, to obtain second signature information; and generating the first initial response message that carries the second signature information and the to-be-signed initial response information, and transmitting the first initial response message to the client, the second signature information causing the client to determine validity of the first initial response message.

20. The storage medium according to claim 15, wherein generating the second prepared certificate corresponding to the second request message comprises:

generating a pre-prepare message based on the sequence number n+1 assigned to the second request message and the second request message;

broadcasting the pre-prepare message to the one or more backup nodes, for the one or more backup nodes to check the pre-prepare message to obtain a first check result, the first check result causing the backup node to generate, in response to the first check result being successful, a prepare message corresponding to the second request message; and obtaining the prepare message returned by the one or more backup nodes, and generating the second prepared certificate corresponding to the second request message based on the obtained prepare message.

* * * * *